(12) United States Patent
Goto et al.

(10) Patent No.: US 8,882,171 B2
(45) Date of Patent: Nov. 11, 2014

(54) VEHICLE FLOOR MAT

(75) Inventors: Takashi Goto, Ashikaga (JP); Kana Harata, Sakura (JP); Tohru Ohba, Wako (JP); Tatsuya Shiono, Wako (JP); Hirobumi Kikuchi, Wako (JP); Mitsuyoshi Nakamura, Wako (JP)

(73) Assignees: Honda Access Corp., Niiza-shi (JP); Honda Motor Co., Ltd., Tokyo (JP)

( * ) Notice: Subject to any disclaimer, the term of this patent is extended or adjusted under 35 U.S.C. 154(b) by 303 days.

(21) Appl. No.: 13/552,198

(22) Filed: Jul. 18, 2012

(65) Prior Publication Data

US 2013/0049396 A1 Feb. 28, 2013

(30) Foreign Application Priority Data

Aug. 30, 2011 (JP) ................... 2011-188013
Aug. 30, 2011 (JP) ................... 2011-188014
Nov. 24, 2011 (JP) ................... 2011-256807

(51) Int. Cl.
*B60N 3/04* (2006.01)

(52) U.S. Cl.
CPC ..................... *B60N 3/046* (2013.01)
USPC ............................ 296/97.23; 16/4

(58) Field of Classification Search
USPC ............ 296/97.23, 1.02, 37.14; 16/4; 24/306; 428/99
See application file for complete search history.

(56) References Cited

U.S. PATENT DOCUMENTS

| | | | | |
|---|---|---|---|---|
| 4,086,679 A | * | 5/1978 | Butler | ................................ 16/4 |
| 6,202,261 B1 | * | 3/2001 | Moore et al. | ................ 24/115 R |
| 6,497,003 B2 | * | 12/2002 | Calabrese | ........................... 16/4 |
| 7,540,066 B2 | * | 6/2009 | Aoki et al. | .......................... 16/4 |
| 7,546,661 B2 | * | 6/2009 | Connor, Jr. | ........................ 16/4 |
| 2010/0212119 A1 | * | 8/2010 | Dendo | ........................... 24/453 |

FOREIGN PATENT DOCUMENTS

JP 2010-195179 A 9/2010

* cited by examiner

*Primary Examiner* — Pinel Romain
(74) *Attorney, Agent, or Firm* — Westerman, Hattori, Daniels & Adrian, LLP

(57) ABSTRACT

Provided is a vehicle floor mat that can reliably maintain a fixed state and includes a mat main body and at least one fastening device for fastening the mat main body to a vehicle. The fastening device includes a first fastening member fixed to the vehicle and a second fastening member fixed to the mat main body. The first fastening member includes a rotating knob rotating about a vertical axis and a lever pivotally provided on an upper section of the knob. The second fastening member includes an insertion receiving section for the knob to be inserted thereinto, and engaged therewith by rotating the knob inserted into the insertion receiving section. A rotation of the knob in an engaged state is restricted by laying the lever. The knob and lever allow the mat main body to be fixed to the vehicle through a two-step fixation mechanism, thus enabling strong fixation.

14 Claims, 23 Drawing Sheets

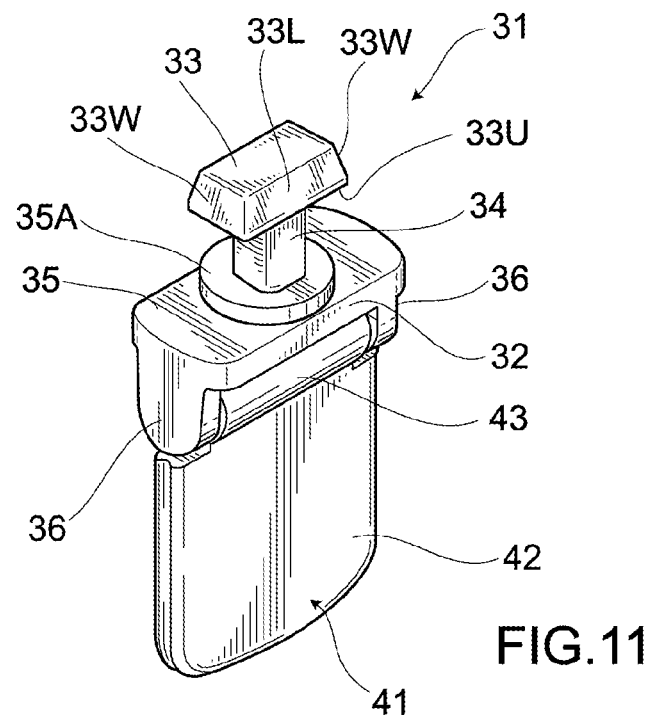
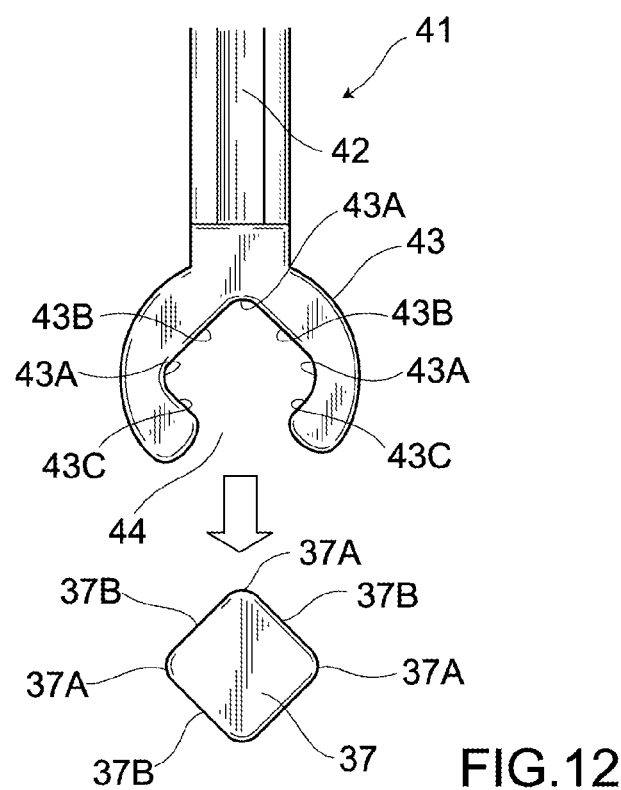
FIG.11
FIG.12

VEHICLE FLOOR MAT

BACKGROUND OF THE INVENTION

1. Field of the Invention

The present invention relates to a vehicle floor mat including at least one fastening device.

2. Description of Related Art

Conventionally, as an invention of such kind, there has also been disclosed a fastening device (e.g., Japanese Unexamined Patent Application Publication No. 2010-195179) for fastening a floor mat to a carpet. This fastening device is composed of: a first fastening member attached to a circumferential section of an attachment hole of the carpet; a knob attached to the first fastening member; and a second fastening member having a through hole disposed in a center thereof and being attached to a circumferential section of an attachment hole of the floor mat. The first fastening member is composed of a first carpet grommet and a second carpet grommet that serve to vertically sandwich therebetween the circumferential section of the attachment hole of the carpet. The first carpet grommet and the second carpet grommet are provided with: a first carpet grommet flange and a second carpet grommet flange that abut against the circumferential section of the attachment hole of the carpet; and engageable sections allowing the first carpet grommet and the second carpet grommet to be connected to each other with the carpet being sandwiched therebetween. Further, the second carpet grommet is provided with a knob base for receiving and connecting to the knob. Particularly, the knob base is a cylindrical body raised from the second carpet grommet flange and having a center space in which a knob receiving hole for receiving the knob is formed. The first carpet grommet is provided with a through hole allowing the knob base to be inserted therethrough. The knob, when inserted into the knob base, can be connected to the corresponding knob base in a manner such that the knob becomes axially rotatable in the knob base. Here, the knob includes: a knob top portion formed so large that it can abut against a circumferential section of the through hole of the second fastening member; and a knob axial portion to be inserted into the knob base. Further, the knob base includes: a base engagement section formed outside the cylindrical body and engageable with an engagement section of the first carpet grommet; and knob connecting engagement claws formed inside the cylindrical body and engageable with an engagement section of the knob axial portion inserted into the knob receiving hole. The knob is allowed to axially rotate in the knob base such that there are enabled: an unlocked position in which the knob top portion is not engaged with the second fastening member; and a locked position in which the knob top portion is engaged with the second fastening member. As mentioned above, the first carpet grommet and the second carpet grommet of the first fastening member serve to vertically sandwich the carpet therebetween. Meanwhile, the second fastening member is attached to the floor mat, and the knob is connected to the knob base. Here, the second fastening member attached to the floor mat is then placed on top of the first carpet grommet of the first fastening member attached to the carpet, such that the knob top portion is inserted through the through hole of the second fastening member. Subsequently, once the knob has been axially rotated from the unlocked position to the locked position, the knob top portion will abut against the engagement section formed on the second fastening member, thereby pressing the second fastening member against the first fastening member in the axial direction, thus allowing the floor mat to be fixed to the carpet.

SUMMARY OF THE INVENTION

According to the fastening device disclosed in Japanese Unexamined Patent Application Publication No. 2010-195179, the knob is axially rotated from the unlocked position to the locked position to fasten the floor mat to the carpet. Therefore, the lock will not be released unless a passenger or the like rotates the knob in an opposite direction through a usual operation. However, the lock may still be inadvertently released when, for example, a passenger's shoe comes into contact with the knob and causes the same to rotate.

Further, a protrusion of the knob axial portion elastically engages with the groove of the knob base as the knob axial portion has been axially rotated to the locked position. Here, while there can be achieved a feeling of rotating the knob to the locked position, repeated use of the device may cause a click feeling to become less noticeable. Further, the fastening device employs the engagement between a general protrusion and a general groove. For these reasons, it has been desired that an operational feeling be improved.

The present invention has been made to solve the aforementioned problems, and it is an object of the present invention to provide a vehicle floor mat capable of reliably maintaining a fixed state.

Further, it is also an object of the present invention to provide a vehicle floor mat allowing a second fastening member to be fixed to a first fastening member through a rotating operation of a rotating knob, and enabling a favorable click feeling for a long period of time.

In order to achieve the aforementioned objectives, the invention as set forth in a first aspect provides a vehicle floor mat including: a mat main body; and at least one fastening device for fastening the mat main body to a vehicle, in which the fastening device includes: a first fastening member fixed to the vehicle; and a second fastening member fixed to the mat main body, in which the first fastening member includes: a rotating knob rotating about a vertical axis; and a lever pivotally provided on an upper section of the rotating knob, and the second fastening member includes an insertion receiving section for the rotating knob to be inserted thereinto, and then engaged therewith by rotating the rotating knob inserted into the insertion receiving section, the rotating knob, when engaged with the insertion receiving section, being further restricted from rotating by bringing down the lever.

Further, according to the invention as set forth in a second aspect, the second fastening member further includes at least one engagement section for the lever to be engaged therewith when brought down.

Furthermore, according to the invention as set forth in a third aspect, the engagement section is an engagement concave section for the lever to be engaged therewith when brought down.

Furthermore, according to the invention as set forth in a fourth aspect, the lever is formed to a length fitting within an edge of the second fastening member when the lever is engaged with the engagement concave section.

Furthermore, according to the invention as set forth in a fifth aspect, the lever is brought down substantially along an advancement direction of the vehicle.

Furthermore, the invention as set forth in a sixth aspect is a vehicle floor mat including: a mat main body; and at least one fastening device for fastening the mat main body to a vehicle, in which the fastening device includes: a first fastening member fixed to the vehicle; and a second fastening member fixed to the mat main body, in which the first fastening member includes a rotating knob rotating about a vertical axis, and the second fastening member includes an insertion receiving section for the rotating knob to be inserted thereinto, and then engaged therewith by rotating the rotating knob inserted into the insertion receiving section, the rotating knob including: an operable portion provided on an upper section thereof; a connection holding portion provided on a lower section thereof and connected to the first fastening member; and an intermediate portion that is provided between the operable portion and the connection holding portion and has a noncircular cross-sectional surface, the intermediate portion being rotatably and axially supported by the first fastening member and held by elastic holding walls provided on the first fastening member.

Furthermore, according to the invention as set forth in a seventh aspect, the holding walls include supporting portions formed therebehind.

Furthermore, according to the invention as set forth in an eighth aspect, the holding walls and the supporting portions are provided with gaps formed therebetween.

Furthermore, the invention as set forth in a ninth aspect is a vehicle floor mat including: a mat main body; and at least one fastening device for fastening the mat main body to a vehicle, in which the fastening device includes: a first fastening member fixed to the vehicle; and a second fastening member fixed to the mat main body, the first fastening member including a rotating knob rotating about a vertical axis, and the second fastening member including: a rotation inhibiting member inhibiting a rotation of the rotating knob; and an insertion receiving section for the rotating knob to be inserted thereinto, and then engaged therewith by rotating the rotating knob inserted into the insertion receiving section.

Furthermore, according to the invention as set forth in a tenth aspect, the rotation inhibiting member is composed of a lever pivotally provided on an upper section of the second fastening member, the lever allowing one end thereof to be supported by the second fastening member and an other end thereof to be brought down toward the rotating knob to hold the rotating knob.

Furthermore, according to the invention as set forth in an eleventh aspect, the lever can keep holding the rotating knob only when the first fastening member and the second fastening member are engaged with each other through the rotating knob.

Furthermore, according to the invention as set forth in a twelfth aspect, the lever allows the other end thereof to engage with the rotating knob through which the first fastening member and the second fastening member have been engaged with each other.

Furthermore, according to the invention as set forth in a thirteenth aspect, the second fastening member further includes a concave section for the lever to engage therewith when brought down.

According to the vehicle floor mat as set forth in the first aspect of the present invention, the rotating knob and the lever allow the mat main body to be fixed to the vehicle through a two-step fixation mechanism, thus enabling a strong fixation.

According to the vehicle floor mat as set forth in the second aspect of the present invention, the lever, when brought down, engages with one of the engagement sections provided on the second fastening member, thus restricting the rotation of the rotating knob.

According to the vehicle floor mat as set forth in the third aspect of the present invention, the lever, when brought down, is received and held by one of the engagement concave sections of the second fastening member, thereby enabling a strong fixation, restricting the rotation of the rotating knob, and allowing the mat main body to be fixed without troublesome feeling due to the fact that there are now less protrusions.

According to the vehicle floor mat as set forth in the fourth aspect of the present invention, a front end of the lever does not protrude, and is thereby less likely to come into contact with a shoe or the like, thus allowing the mat main body to be fixed without troublesome feeling.

According to the vehicle floor mat as set forth in the fifth aspect of the present invention, the lever can be brought down either forward or backward to enable fixation, thus allowing the second fastening member to be mounted easily. Particularly, a structure allowing the lever to be brought down forward makes operations at the time of mounting/dismounting easier, whereas a structure allowing the lever to be brought down backward makes locations of passengers' feet less influential when fixing the mat main body.

According to the vehicle floor mat as set forth in the sixth aspect of the present invention, since the intermediate portion of the rotating knob is held by the elastic holding walls, the rotating knob can be rotated smoothly, thus achieving an improved operational feeling. Further, since the holding walls holding the intermediate portion are formed into the shapes of walls, durabilities of the holding walls can be improved, thus making the operational feeling available for a long period of time.

According to the vehicle floor mat as set forth in the seventh aspect of the present invention, since the supporting portions are formed behind the holding walls holding the intermediate portion of the rotating knob, there can be adjusted a force used to operate the rotating knob, thereby improving a degree of freedom of setting the operational feeling.

According to the vehicle floor mat as set forth in the eighth aspect of the present invention, the gap is provided between each holding wall holding the intermediate portion of the rotating knob and each supporting portion, thereby widening a range of adjustment of the operational force of the rotating knob, thus further improving the degree of freedom of setting the operational feeling.

According to the vehicle floor mat as set forth in the ninth aspect of the present invention, the rotating knob and the lever allow the mat main body to be fixed to the vehicle through the two-step fixation mechanism, thus enabling a strong fixation.

According to the vehicle floor mat as set forth in the tenth aspect of the present invention, the lever, when brought down, holds the rotating knob, thus enabling a strong fixation.

According to the vehicle floor mat as set forth in the eleventh aspect of the present invention, the lever can keep holding the rotating knob when the first fastening member and the second fastening member are engaged with each other through the rotating knob, thus reliably maintaining the engaged state of the lever.

According to the vehicle floor mat as set forth in the twelfth aspect of the present invention, the lever, when holding the rotating knob, is actually engaged with the corresponding rotating knob, thereby reliably keeping holding the rotating knob. Further, since the other end of the lever is to be engaged with the rotating knob, the front end of the lever does not protrude, and is thereby less likely to come into contact with a shoe or the like, thus allowing the mat main body to be fixed without troublesome feeling.

According to the vehicle floor mat as set forth in the thirteenth aspect of the present invention, the lever engages with the concave section, thereby resulting in no protrusion, thus allowing the mat main body to be fixed without troublesome feeling.

BRIEF DESCRIPTION OF THE DRAWINGS

FIG. 11 is a perspective view showing, from a downward direction, the rotating knob of the first embodiment that is equipped with the lever.

FIG. 12 is an enlarged cross-sectional view showing main sections of the rotating knob and the lever of the first embodiment.

DETAILED DESCRIPTION OF THE INVENTION

Figure 1:
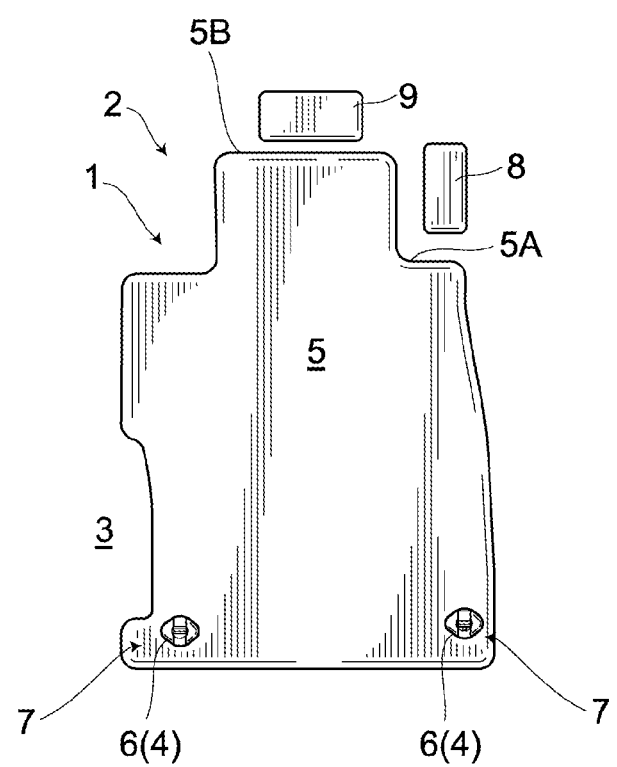
FIG. 1 is an overall plan view showing a first embodiment of the present invention.

Embodiments of a vehicle floor mat of the present invention are described hereunder with reference to the accompanying drawings.

First Embodiment

A first embodiment is shown in FIG. 1 through FIG. 22. As shown in these drawings, a vehicle floor mat 1 includes: at least one first fastening member 4 that is made of synthetic resin and fixed to a vehicle carpet 3 provided on a vehicle floor 2; a mat main body 5 detachably laid on the vehicle carpet 3; and at least one second fastening member 6 that is also made of synthetic resin and fixed to the mat main body 5. The first fastening member 4 and the second fastening member 6 compose a fastening device 7 allowing the mat main body 5 to be fastened to a vehicle. Here, a synthetic resin can, for example, be POM (polyacetal) or the like.

As shown in FIG. 1, the mat main body 5 is, for example, laid on the vehicle floor 2 on a driver's side in the vehicle. A gas pedal 8 extending in a front-rear direction is located on a right side of the vehicle floor 2 on the driver's side, whereas a brake pedal 9 extending in a left-right direction is located on a left side of the gas pedal 8. Further, a recess 5A corresponding to the gas pedal 8 is provided on a front right corner of the mat main body 5. Furthermore, a front end edge 5B of the mat main body 5 is positioned proximally to the brake pedal 9. Particularly, a space is provided between the front end edge 5B of the mat main body 5 and the brake pedal 9 such that the mat main body 5 and the brake pedal 9 do not interfere with each other.

Figure 4:
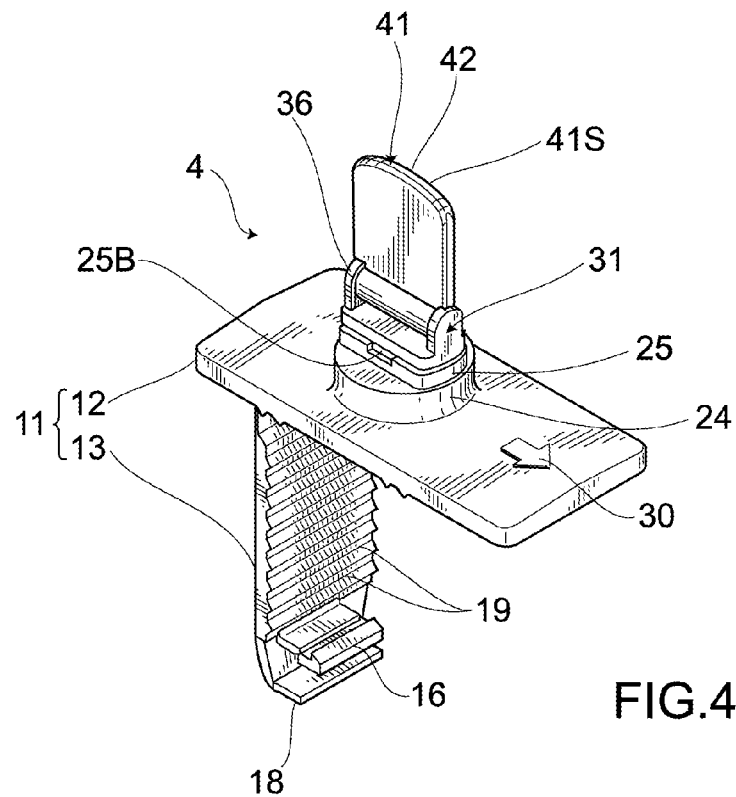
FIG. 4 is a perspective view showing a first fastening member of the first embodiment.
Figure 5:
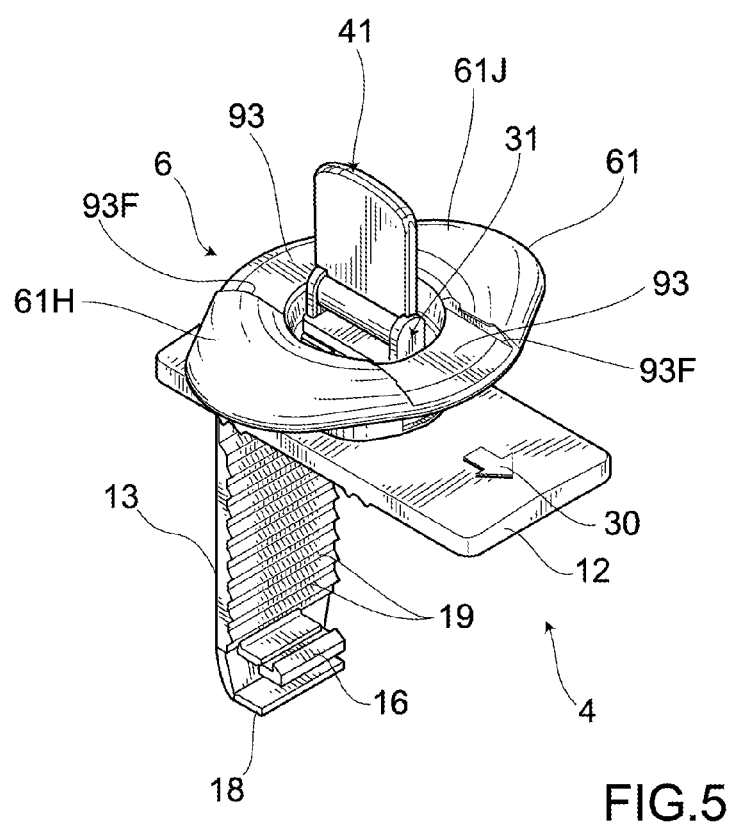
FIG. 5 is a perspective view showing a fastening device of the first embodiment in which a rotating knob has been rotated to an unlocked position.
Figure 6:
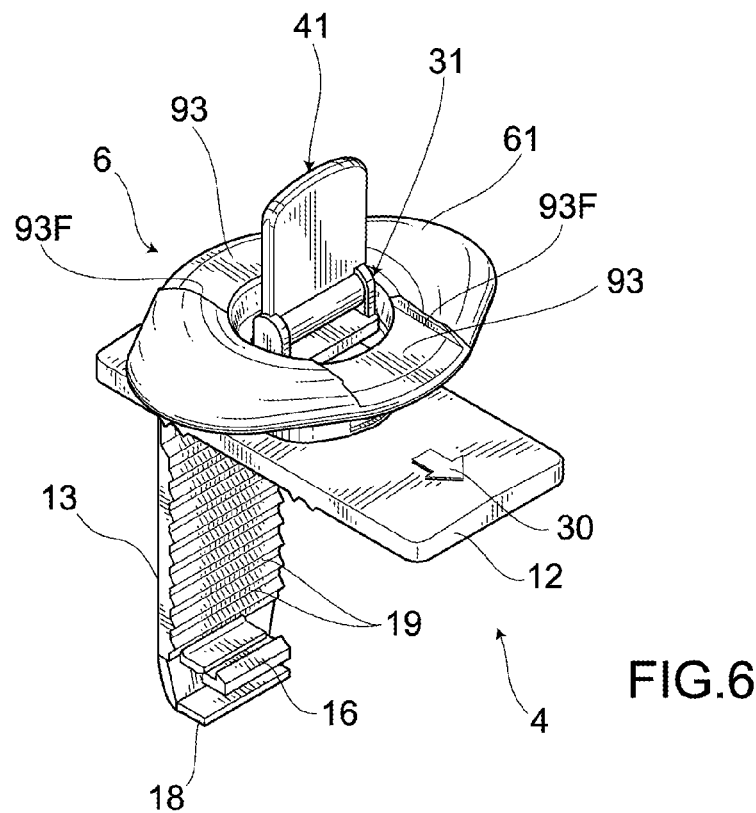
FIG. 6 is a perspective view showing the fastening device of the first embodiment in which the rotating knob has been rotated to a locked position.
Figure 7:
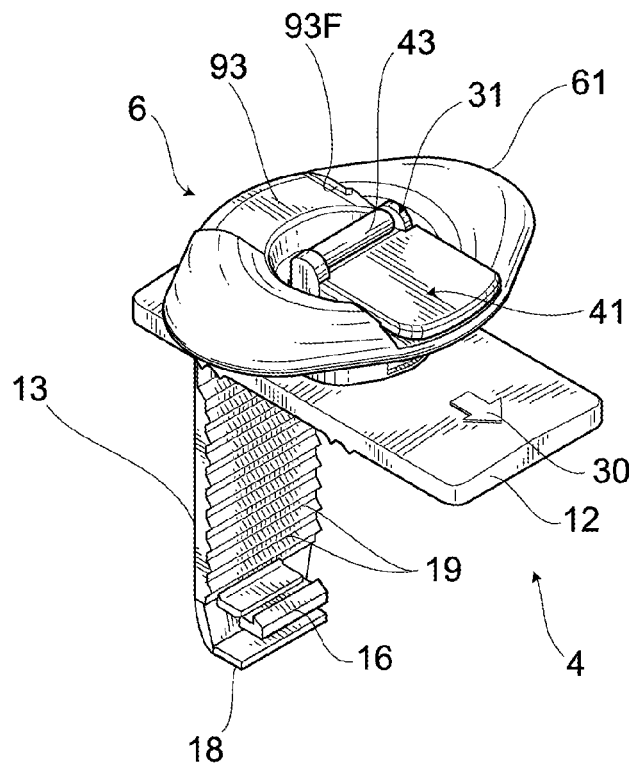
FIG. 7 is a perspective view showing the fastening device of the first embodiment in which a lever of the rotating knob rotated to the locked position has been brought down.

As shown in FIG. 4, for example, the first fastening member 4 includes a carpet fixing portion 11 to be fixed to the vehicle carpet 3. The carpet fixing portion 11 further includes: a plate-shaped upper base portion 12 to be disposed on an upper surface of the vehicle carpet 3; and a lower sandwiching portion 13 that is to be disposed on a lower surface of the vehicle carpet 3 and sandwiches the corresponding vehicle carpet 3 in a manner such that the vehicle carpet 3 is actually held between the lower sandwiching portion 13 and the upper base portion 12. The upper base portion 12 has a substantially rectangular shape when viewed from top. The lower sandwiching portion 13, when viewed from top, also has a substantially rectangular shape extending in a same direction as the upper base portion 12, the lower sandwiching portion 13 being formed smaller than the upper base portion 12. Further, a penetrating portion 14 protrudes from one side of a lower surface of the upper base portion 12 in a longitudinal direction, the penetrating portion 14 having a lower end connected to one end of the lower sandwiching portion 13 in the longitudinal direction. A thin-walled hinge portion 15 is then provided between the penetrating portion 14 and the lower sandwiching portion 13. Furthermore, an elastic claw 16 facing upward protrudes from an other end side of the lower sandwiching portion 13 in the longitudinal direction. A claw receiving portion 17 allowing the elastic claw 16 to be elastically connected thereto, is provided on the lower surface of the upper base portion 12. Furthermore, a raised portion 18 bended upward is provided on an other end of the lower sandwiching portion 13, the raised portion 18 being located beyond the claw receiving portion 17 and allowing the corresponding claw receiving portion 17 to be hidden thereinside in a fixed state. Furthermore, a plurality of concavities and convexities 19 are formed on an upper surface of the lower sandwiching portion 13. Here, the elastic claw 16 and the claw receiving portion 17 compose a connector 20 of the first fastening member 4 that allows the upper base portion 12 and the other end of the lower sandwiching portion 13 to be elastically connected to each other.

Figure 2:
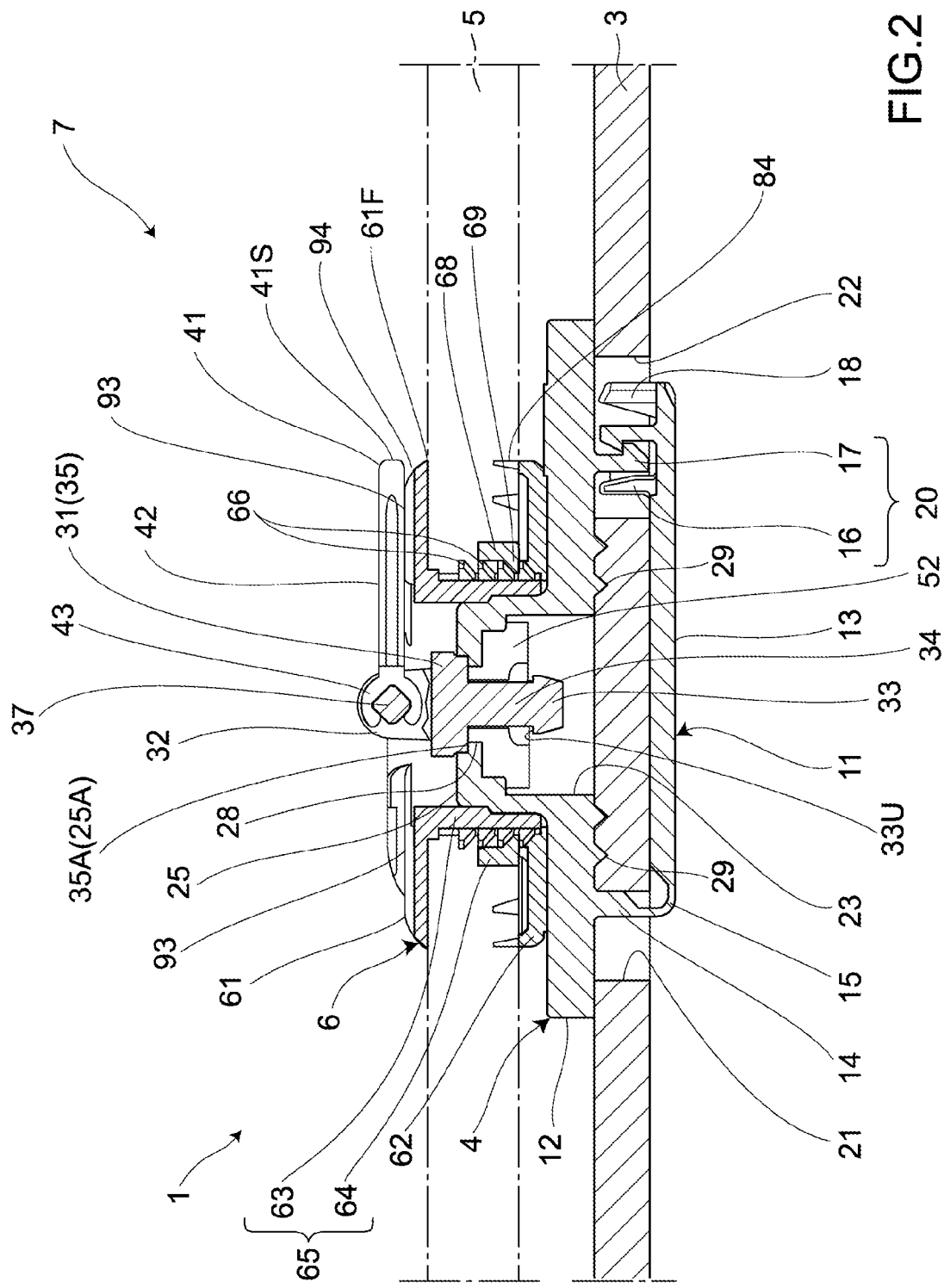
FIG. 2 is a cross-sectional view of the first embodiment that is taken along an advancement direction.

As shown in FIG. 2, for example, the vehicle carpet 3 has a first and a second through holes 21, 22 bored therein, the first and second through holes 21, 22 being provided as a pair and corresponding to a mounting location of the first fastening member 4. Here, the lower sandwiching portion 13 is inserted through the first through hole 21 from above the vehicle carpet 3. At the same time, the claw receiving portion 17 is inserted through the second through hole 22. Particularly, the lower sandwiching portion 13 thus inserted is then bent around the hinge portion 15 and toward the vehicle carpet 3, thereby allowing the elastic claw 16 on the front end to be elastically engaged with the claw receiving portion 17, thus causing the vehicle carpet 3 to be held by the upper base portion 12 and the lower sandwiching portion 13 in a vertical direction and the first fastening member 4 to be fixed to the vehicle carpet 3 eventually. At that time, the elastic claw 16, the claw receiving portion 17 and the raised portion 18 are accommodated in the second through hole 22. Here, since the claw receiving portion 17 is now located between the elastic claw 16 and the raised portion 18, the claw receiving portion 17 does not come into contact with an inner edge of the second through hole 22. Further, even if the elastic claw 16 does come into contact with the inner edge of the second through hole 22, the elastic claw 16 will not be disengaged from the claw receiving portion 17 due to the fact that the elastic claw 16 is being pushed in an engagement direction. Furthermore, since the concavities and convexities 19 abut against the lower surface of the vehicle carpet 3 in the fixed state, there can be prevented a deviation in the location of the first fastening member 4 with respect to the vehicle carpet 3.

A through hole 23 is bored substantially in a center of the upper base portion 12. Further, a cylindrical portion 24 protrudes upward from the through hole 23. The cylindrical portion 24 is provided with a raised center upper surface 25 formed in an upper center section of the corresponding cylindrical portion 24, the center upper surface 25 extending in the longitudinal direction of the first fastening member 4, and having therearound a step portion 26 and a horizontal step level surface 27 that is one step down from the center upper surface 25. The step level surface 27 is formed wider in the longitudinal direction of the center upper surface 25 than in a width direction thereof. Further, an elongated hole 28 extending in a same direction as the center upper surface 25, is bored substantially in a center of the center upper surface 25.

Figure 8:
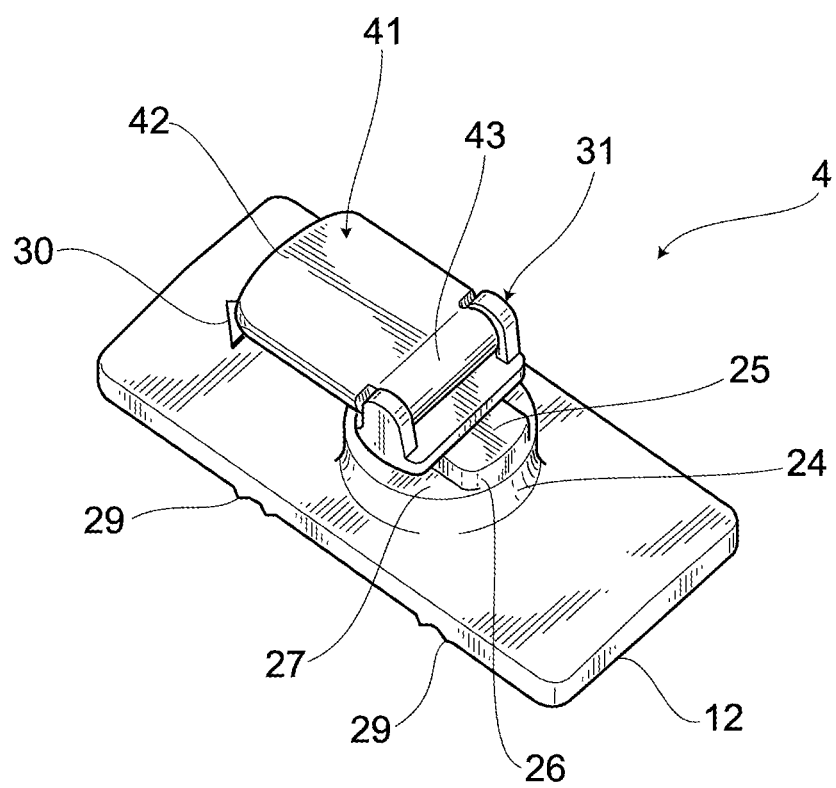
FIG. 8 is a perspective view showing the first fastening member of the first embodiment, in which a lower sandwiching portion is omitted.
Figure 9:
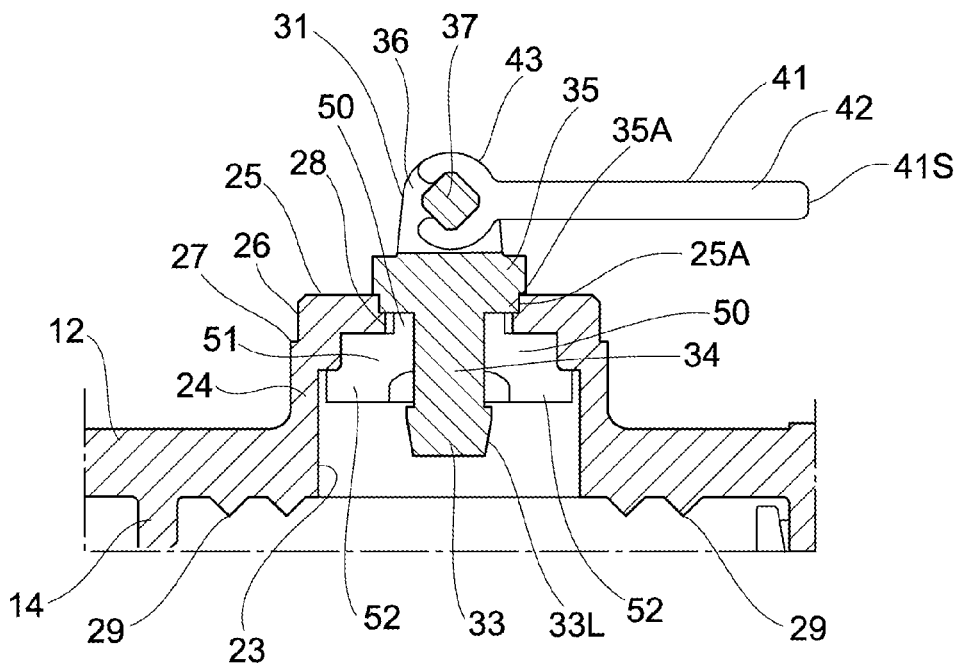
FIG. 9 is a cross-sectional view showing a main section of the first fastening member of the first embodiment.
Figure 10:
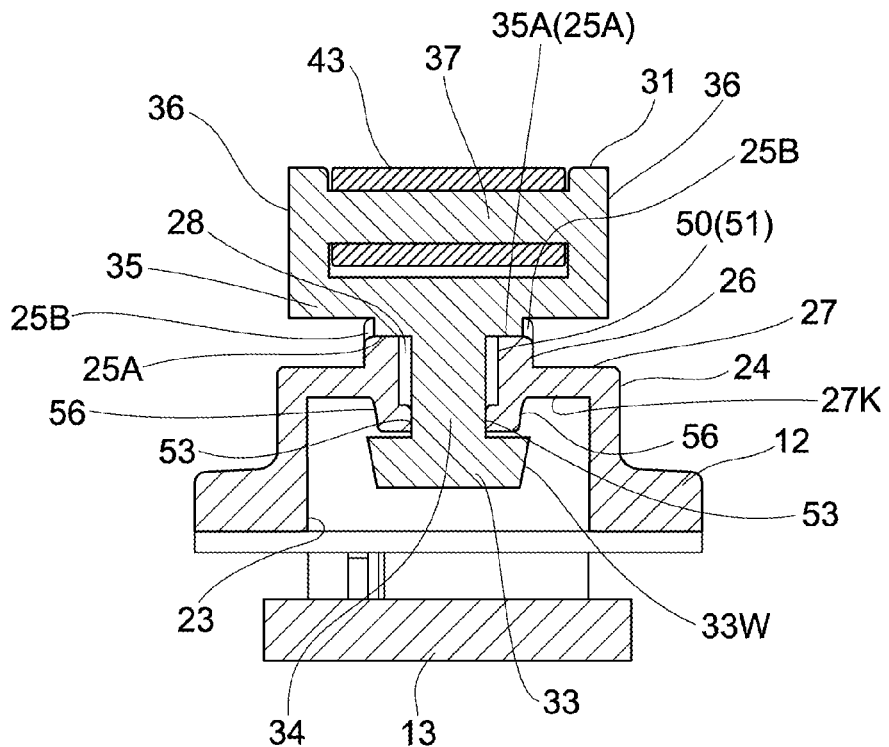
FIG. 10 is a cross-sectional view of the main section of the first fastening member of the first embodiment, that is taken along a direction orthogonal to the direction in FIG. 9.

Further, as shown in FIG. 8, concavo-convex portions 29 are formed on the lower surface of the upper base portion 12 in a manner such that the through hole 23 is positioned therebetween. Furthermore, a symbol 30 indicating a mounting direction of the first fastening member 4 is provided on an upper surface of the upper base portion 12. In the present embodiment, the symbol 30 is formed into a shape of an arrow indicating the mounting direction.

A rotating knob 31 made of synthetic resin is rotatably and axially supported on the upper base portion 12 of the first fastening member 4. The rotating knob 31 thus provided on the first fastening member 4 serves as a retainer that is to be engaged with the aforementioned second fastening member 6.

Further, as shown in FIG. 11 which is a bottom perspective view, the rotating knob 31 includes: an operable portion 32 provided on an upper section thereof; and a connection holding portion 33 provided on a lower section thereof and serving as a disengagement prevention connector. The rotating knob 31 further includes an intermediate portion 34 that serves as an axial member and is integrally provided between the operable portion 32 and the connection holding portion 33. The operable portion 32 includes a base portion 35 having a length substantially identical to that of the center upper surface 25. The base portion 35 includes vertical sections 36, 36 protruding from both sides of the corresponding base portion 35 that are in the longitudinal direction. Further, a lever connecting shaft 37 is transversely provided between the vertical sections 36, 36. As shown in FIG. 12, for example, a cross-sectional surface of the lever connecting shaft 37 is a deformed square with four corners thereof chamfered. Particularly, there are formed curved corners 37A and linear sections 37B connecting the adjacent curved corners 37A to one another. A lever 41 is connected to the lever connecting shaft 37. The lever 41 integrally includes: a lever main body 42 made of a plate member having a substantially rectangular shape; and a lever connecting section 43 provided on a base end of the lever main body 42. The lever connecting section 43 has a cross-sectional surface of a substantial "C" shape formed by an opening section 44 on a base end side of the cylindrical body. Further, an inner surface shape of the lever connecting section 43 corresponds to an outer surface shape of the lever connecting shaft 37, and includes: three curved corners 43A; linear sections 43B connecting the adjacent curved corners 43A, 43A to one another; and short linear sections 43C connecting the curved corners 43A to the opening section 44. Furthermore, the curved corners 37A of the lever connecting shaft 37 of the rotating knob 31, are formed on the left, right, top and bottom.

Therefore, when pushing the lever 41 downward with the opening section 44 of the lever connecting section 43 being adjusted to the top curved corner 37A of the lever connecting shaft 37, the lever connecting section 43 will undergo elastic deformation and expand accordingly, thereby allowing the lever connecting shaft 37 to be inserted into the lever connecting section 43 and the curved corners 37A to be engaged with the curved corners 43A, thus allowing the lever 41 to be positioned and fixed vertically and horizontally. In this way, the lever 41 can be pivotally mounted with respect to the rotating knob 31.

Further, a circular bearing surface 35A formed around the intermediate portion 34 protrudes from a lower surface of the base portion 35 of the rotating knob 31. Here, a circular concave section 25A corresponding to the circular bearing surface 35A is formed on the center upper surface 25 of the cylindrical portion 24. The circular bearing surface 35A is to be engaged with the circular concave section 25A so as to allow the rotating knob 31 to be rotated. Particularly, an opening section 25B is formed on both sides of the circular concave section 25A in the width direction.

Figure 13:
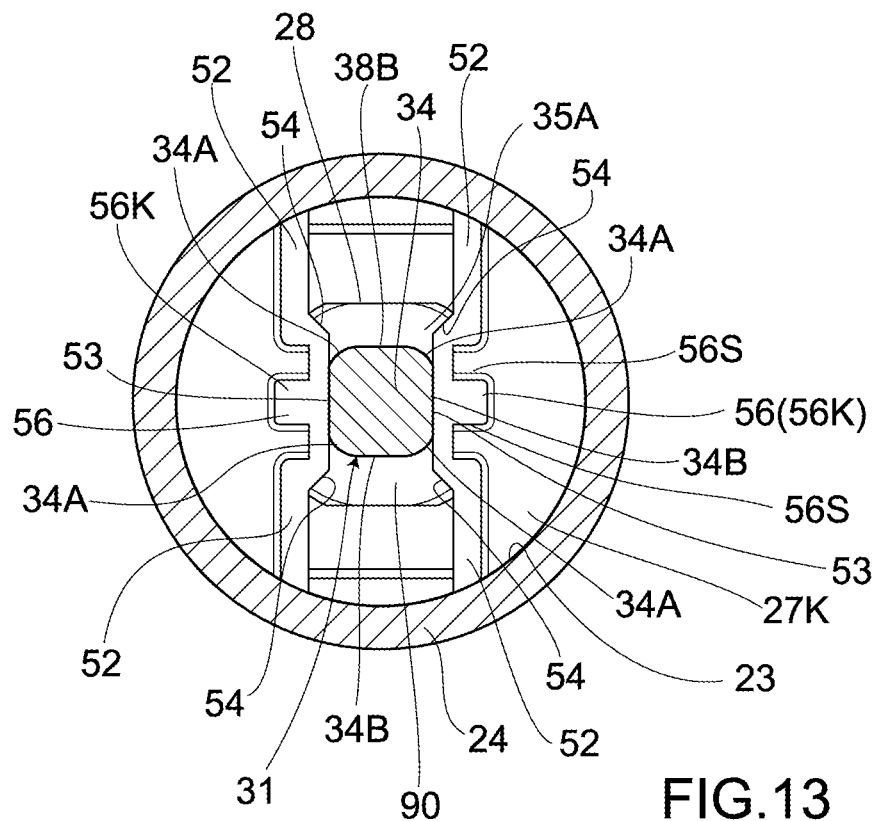
FIG. 13 is a bottom view showing the main section of the first fastening member of the first embodiment, that is taken along a cross-sectional surface of an intermediate portion.
Figure 14:
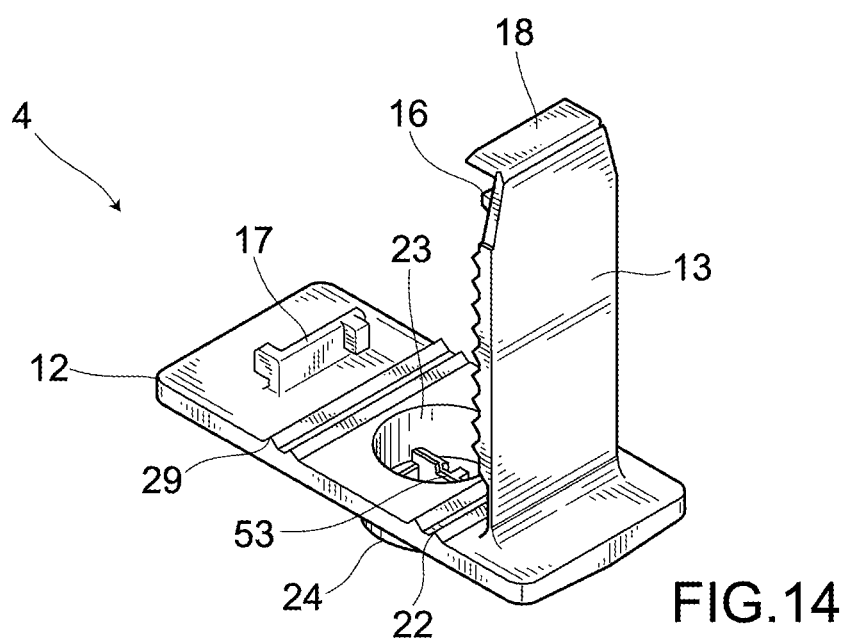
FIG. 14 is a perspective view showing the first fastening member of the first embodiment from a bottom side.
Figure 15:
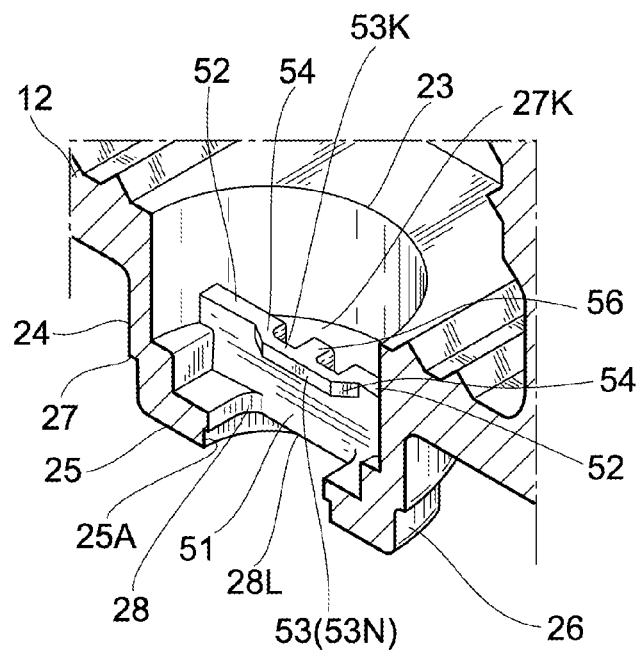
FIG. 15 is a perspective view showing the main section of the first fastening member of the first embodiment from the bottom side.
Figure 16:
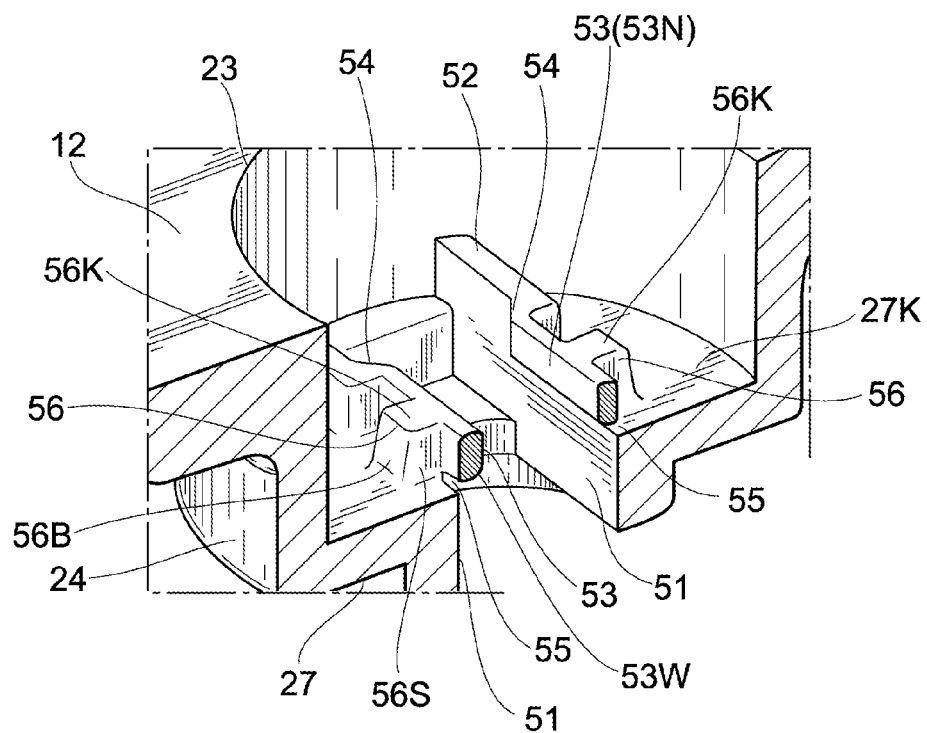
FIG. 16 is a sectional cut-out perspective view showing the first fastening member of the first embodiment from the bottom side.
Figure 17:
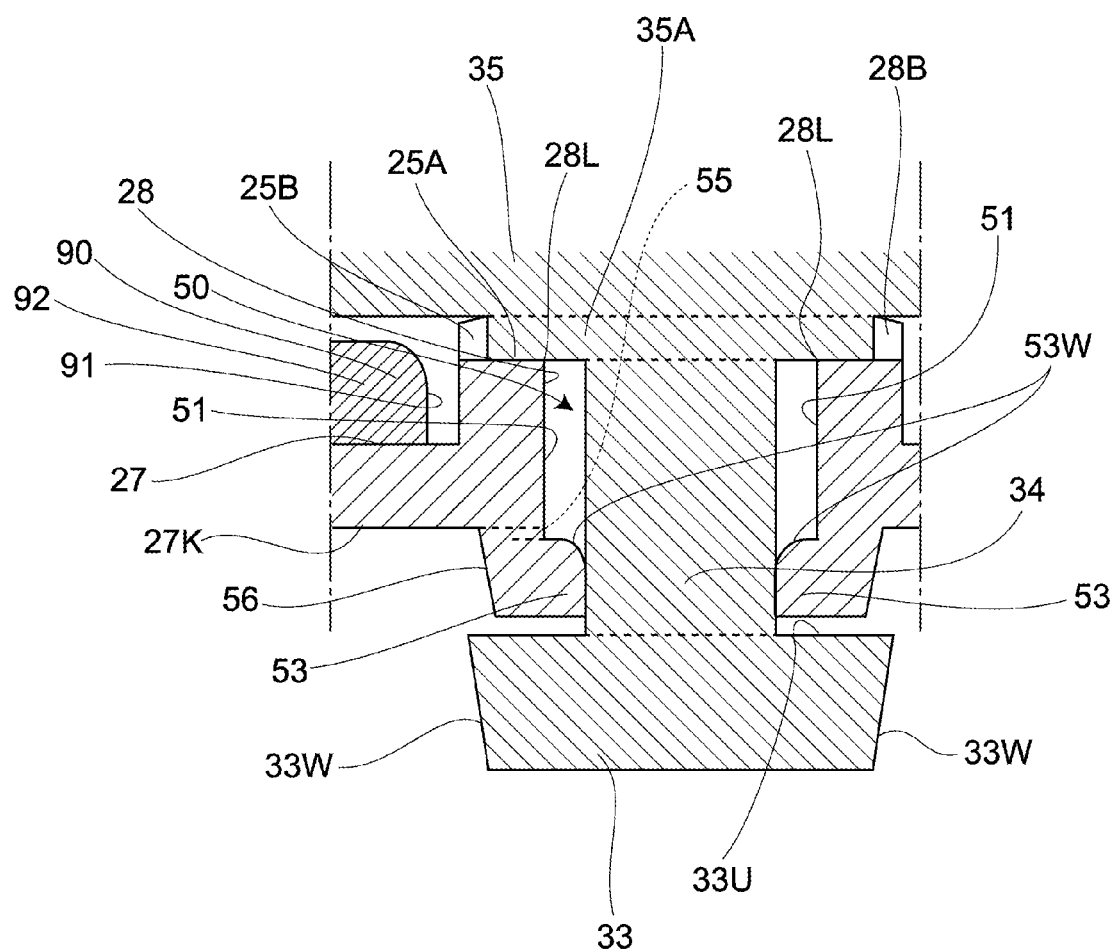
FIG. 17 is an enlarged cross-sectional view showing holding walls and the intermediate portion of the first embodiment.
Figure 18:
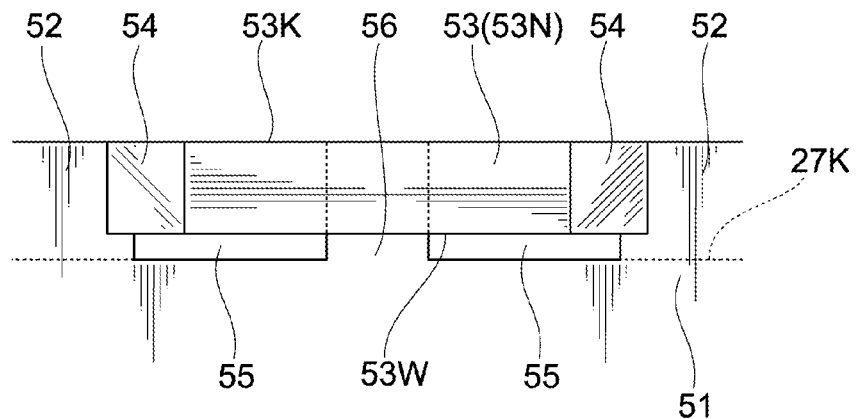
FIG. 18 is a front view of the holding walls of the first embodiment.

As shown in FIG. 13, for example, the intermediate portion 34 has a cross-sectional surface of a noncircular shape as is the case with the lever connecting shaft 37. In the present embodiment, the intermediate portion 34 has a cross-sectional surface of a substantially square shape. Particularly, this cross-sectional surface has: curved corners 34A formed through chamfering; and linear sections 34B formed between the adjacent curved corners 34A, 34A.

The connection holding portion 33 extends in a same direction as the operable portion 32. While the connection holding portion 33 has an upper surface 33U wider than the intermediate portion 34, the connection holding portion 33 itself narrows downward. That is, the connection holding portion 33 has: a pair of side surfaces 33L, 33L extending in the longitudinal direction and inclining toward each other in a downward direction; and a pair of side surfaces 33W, 33W extending in the width direction and also inclining toward each other in the downward direction.

The lower section of the rotating knob 31 is to be inserted into the cylindrical portion 24 through the elongated hole 28. As shown in FIG. 9, FIG. 10, FIG. 15 and FIG. 16, for example, the first fastening member 4 includes a knob receiving section 50 allowing the rotating knob 31 to be engaged therewith in a retained manner, and be rotatably and axially supported thereby. The knob receiving section 50 includes opposed inner surfaces 51, 51 that are formed inside the cylindrical portion 24 and are parallel to each other, the opposed inner surfaces 51, 51 being continuous with long sides 28L, 28L of the elongated hole 28. Further, a lower surface 27K of the step level surface 27 is provided with right and left fixing walls 52, 52 formed on both sides of the elongated hole 28 along the longitudinal direction. Particularly, inner surfaces of the right and left fixing walls 52, 52 are formed in a same plane as the opposed inner surfaces 51, 51. Here, the longitudinal direction of the elongated hole 28 is referred to as a left-right direction when describing a periphery of the cylindrical portion 24.

The knob receiving section 50 includes a type of holding wall 53 that is provided between the right and left fixing walls 52, 52 and allows the intermediate portion 34 of the rotating knob 31 to be engaged therewith, the intermediate portion 34 being held between the holding walls 53, 53 on both sides. Furthermore, as shown in FIG. 13 which is a bottom view, for example, the holding walls 53, 53 protrude inward with inner surfaces 53N, 53N thereof being parallel to each other and to the aforementioned opposed inner surfaces 51, 51. Particularly, right and left sides of each holding wall 53 are connected to the right and left fixing walls 52, 52 through wall connecting sections 54, 54 that are inclined when viewed from top. In addition, an upper edge 53U of each holding wall 53 is separated from the lower surface 27K of the step level surface 27 through a slit 55. A protruding supporting portion 56 serving as a claw portion is integrally provided in a center of an outer surface of each holding wall 53, the supporting portion 56 having an upper section fixed to the lower surface 27K of the step level surface 27. Further, a lower surface 56K of the supporting portion 56 is formed in a same plane as a lower surface 53K of each holding wall 53.

The supporting portion 56 has: right and left side surfaces 56S, 56S that are parallel to each other; a back surface 56B; a plane cross section of a substantially rectangular shape; and a front surface integrally provided on the holding wall 53. Here, as described later, the holding walls 53 will be subjected to a load applied by the intermediate portion 34 as the corresponding intermediate portion 34 rotates.

Therefore, when each holding wall 53 has been subjected to the load applied to the inner surface 53N outward, the holding wall 53 exhibits elastic deformation between the wall connecting sections 54, 54 and the supporting portion 56. As for the section where the supporting portion 56 is formed, the holding wall 53 is elastically deformed only when the supporting portion 56 is elastically deformed as well. That is, the holding wall 53 is more susceptible to elastic deformation in both sides thereof than in the section where the supporting portion 56 is formed. Here, there can be adjusted an elastic deformation amount of each holding wall 53 in the section where the supporting portion 56 is formed, by changing a size of the corresponding supporting portion 56.

As shown in FIG. 13, a distance between the holding walls 53, 53 is substantially identical to a distance H between the linear sections 34B, 34B of the intermediate portion 34, and the width of the upper surface 33U of the connection holding portion 33 is wider than such distance H. Further, the connection holding portion 33 is to be inserted between the holding walls 53, 53. Particularly, a curved corner 53W is formed on an inner corner of the lower surface 53K of each holding wall 53, thus allowing the connection holding portion 33 to be more easily inserted between the holding walls 53, 53.

Here, the connection holding portion 33 of the rotating knob 31 is to be inserted between the holding walls 53, 53 through the elongated hole 28 in the following manner. That is, the connection holding portion 33 is actually pressed into the space between the holding walls 53, 53 along the curved corners 53W. Particularly, the holding walls 53, 53, at that time, will be more distant from each other as a result of elastic deformation, thereby allowing the connection holding portion 33 to pass therebetween and then be engaged with the lower surfaces 53K of the holding walls 53, 53 in a retained manner once the holding walls 53, 53 have been restored, thus also causing the circular bearing surface 35A of the rotating knob 31 to be engaged with the circular concave section 25A formed in an upper section of the elongated hole 28.

Figure 20:
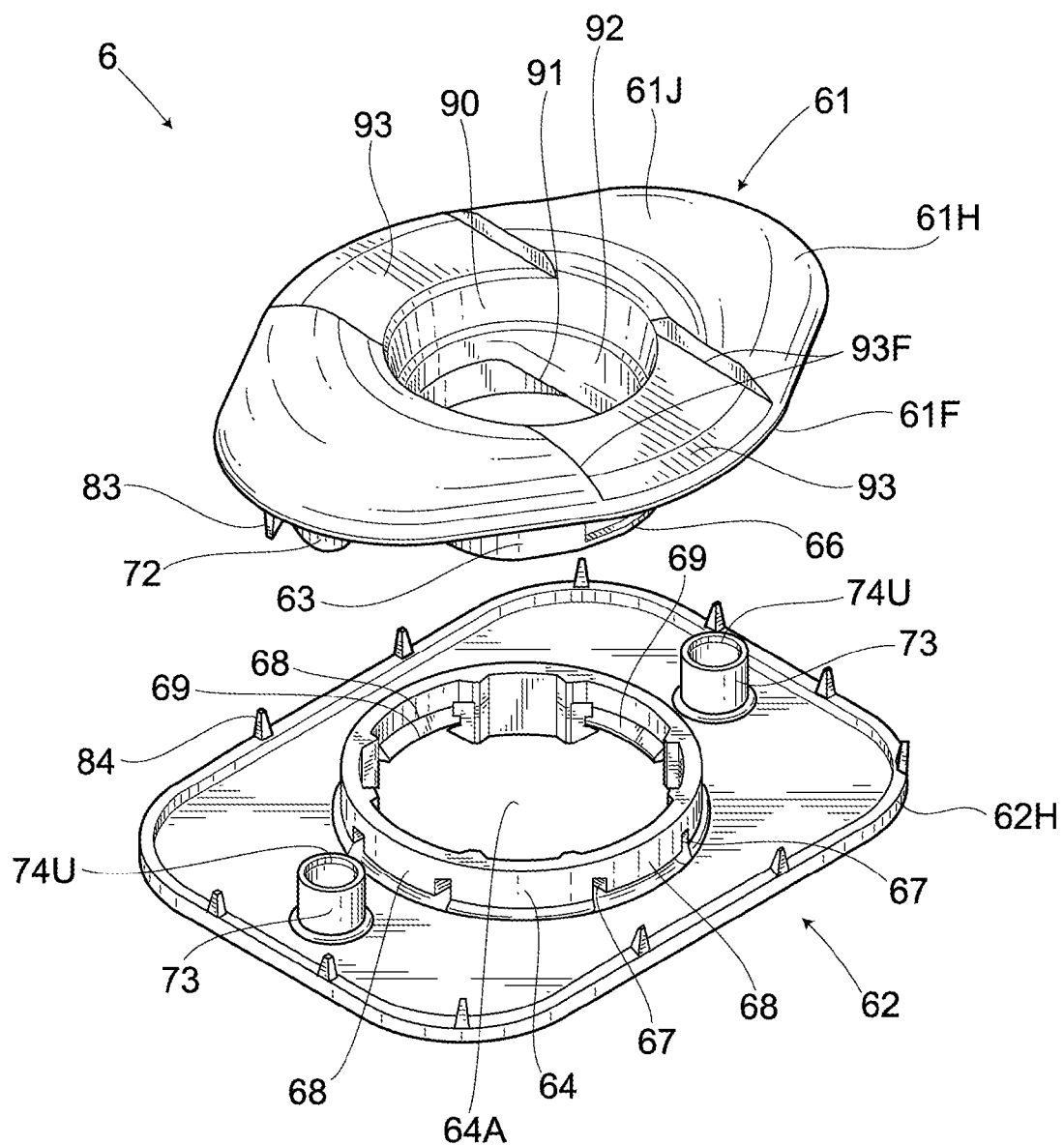
FIG. 20 is an exploded perspective view showing a second fastening member of the first embodiment.
Figure 21:
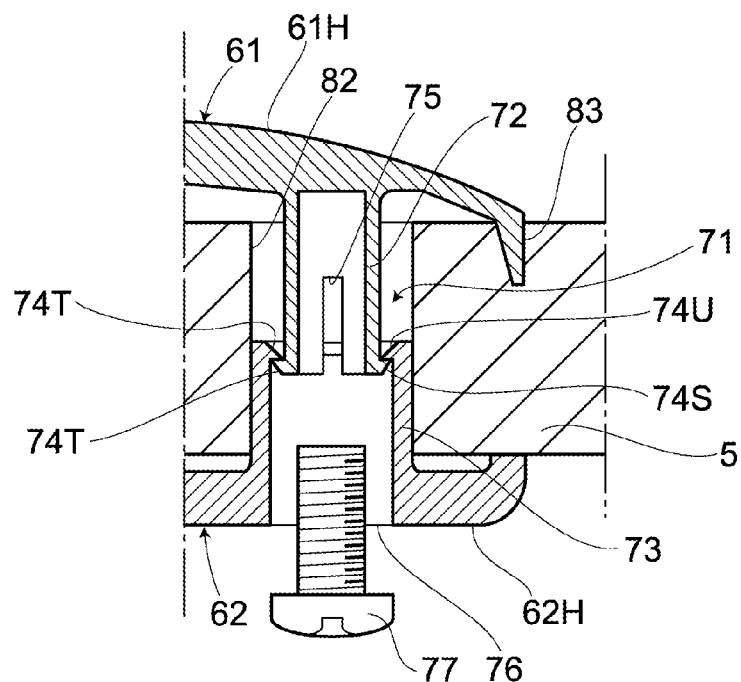
FIG. 21 is an enlarged cross-sectional view showing an outer connecting portion of the second fastening member of the first embodiment.

Next, there is described in detail the second fastening member 6 fixed to the vehicle carpet 3. As shown in FIG. 20, for example, the second fastening member 6 includes an upper half body 61 and a lower half body 62 that serve to sandwich the mat main body 5 in a vertical direction. A main body 61H of the upper half body 61 is substantially formed into an oval shape with a center region thereof being higher than a periphery thereof. Further, an upper cylindrical connection portion 63 protrudes downward from a center of the main body 61H. Meanwhile, a main body 62H of the lower half body 62 is substantially formed into a rectangular shape extending in a same direction as the upper half body 61. Here, a lower cylindrical connection portion 64 that is to be connected to the upper cylindrical connection portion 63, protrudes upward from a center of the main body 62H. Particularly, the lower cylindrical connection portion 64 is provided around an opening section 64A of the main body 62H. Therefore, the upper cylindrical connection portion 63 and the lower cylindrical connection portion 64 are allowed to compose a half body connecting portion 65.

Figure 3:
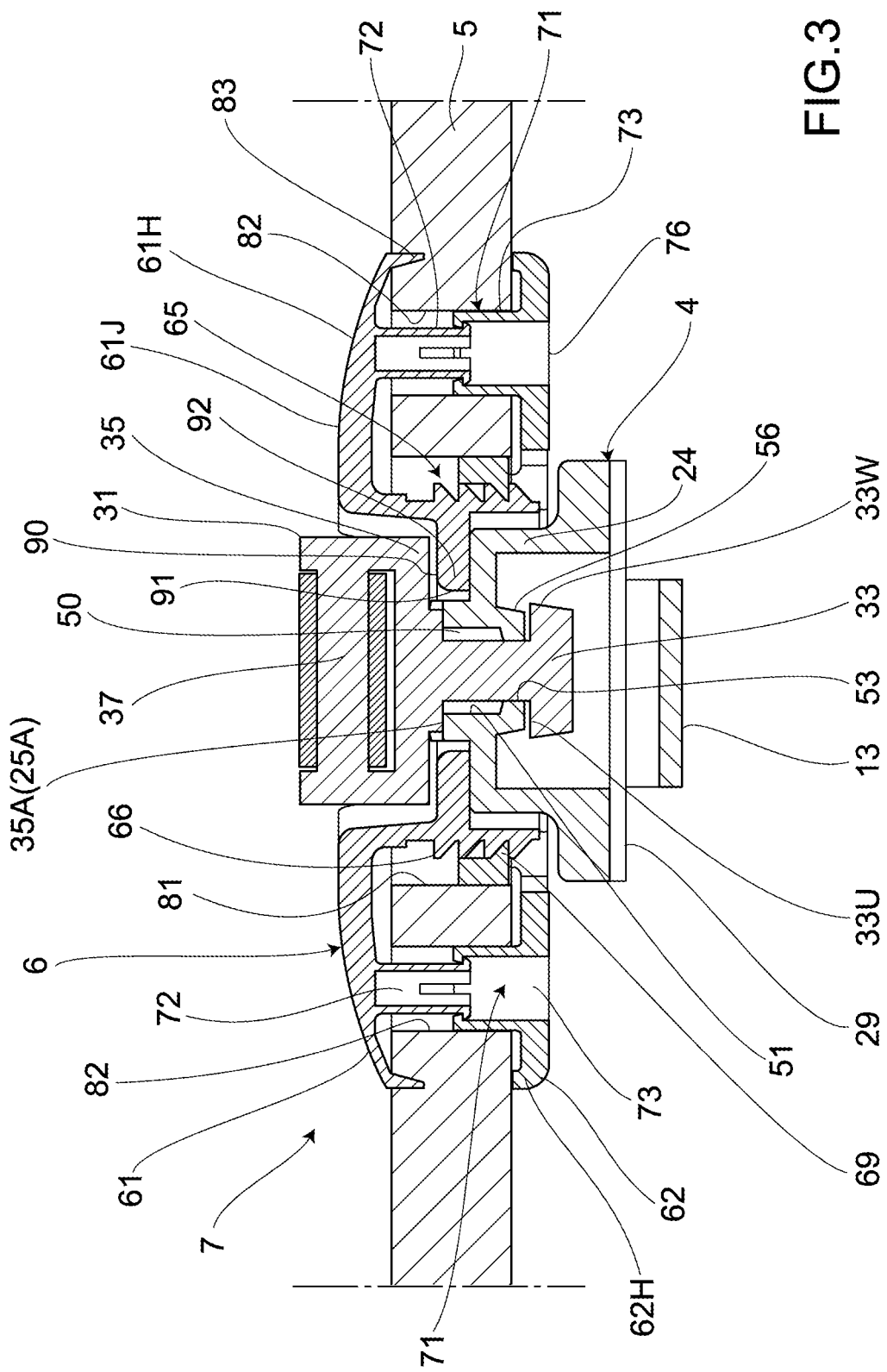
FIG. 3 is a cross-sectional view of the first embodiment that is taken along a direction orthogonal to the advancement direction.

As shown in FIG. 2 and FIG. 3, engagement flange portions 66 are circumferentially provided on an outer circumference of the upper cylindrical connection portion 63, in a multi-row fashion. Particularly, the engagement flange portions 66 have lower surfaces slanting upward from the inside to the outside, and upper surfaces that are substantially horizontal. Further, the lower cylindrical connection portion 64 includes a plurality of cutouts 67, 67 provided at intervals in a circumferential direction and having opened lower ends. Provided between such cutouts 67, 67 are engagement receiving portions 68 with lower ends serving as free ends. Each one of the engagement receiving portions 68 includes an engagement claw section 69 provided on a lower end inner surface thereof and allowing each engagement flange portion 66 to be engaged therewith, the engagement claw section 69 having: an upper surface slanting upward from the inside to the outside; and a lower surface that is substantially horizontal. In the present embodiment, four engagement receiving portions 68 are provided at regular intervals in the circumferential direction. Here, the engagement flange portions 66 can be provided either on the whole circumference of the upper cylindrical connection portion 63, or only in the locations corresponding to the engagement claw sections 69.

Therefore, the engagement flange portions 66 and the engagement claw sections 69 are allowed to compose a connector connecting the upper cylindrical connection portion 63 and the lower cylindrical connection portion 64.

Accordingly, as the upper cylindrical connection portion 63 is being inserted into the lower cylindrical connection portion 64, the engagement receiving portions 68 will move outward as a result of elastic deformation, thereby allowing the engagement flange portions 66 in the given locations to be engaged with the engagement claw sections 69 in a retained manner, thus causing the upper and lower cylindrical connection portions 63, 64 to be connected to each other.

Further, outer connecting portions 71, 71 are symmetrically provided across the aforementioned half body connecting portion 65. Each one of the outer connecting portions 71 includes: an outer upper cylindrical connection portion 72 protruding downward from a lower surface of the upper half body 61; and an outer lower cylindrical connection portion 73 protruding upward from an upper surface of the lower half body 62. An engagement outer flange portion 74S is circumferentially provided on a lower end of the outer upper cylindrical connection portion 72. Also provided on the lower end of the outer upper cylindrical connection portion 72, are a plurality of vertical slits 75. Meanwhile, an engagement inner flange portion 74U is circumferentially provided on an upper end of the outer lower cylindrical connection portion 73. Particularly, as the engagement outer flange portion 74S is being inserted into the engagement inner flange portion 74U, the engagement outer flange portion 74S will undergo elastic deformation so as to cause the slits 75 to narrow, thereby allowing the engagement outer flange portion 74S to be inserted into and connected to the engagement inner flange portion 74U in a retained manner. Further, an opening section 76 is provided in a lower section of the outer lower cylindrical connection portion 73. Furthermore, a connecting member 77 is to be inserted into the outer upper cylindrical connection portion 72 through the opening section 76, thereby preventing the lower end of the outer upper cylindrical connection portion 72 from shrinking, thus retaining the connected state between the engagement outer flange portion 74S and the engagement inner flange portion 74U. Here, when employing a screwable member such as a screw or the like as the connecting member 77, the screwable member can be screwed together with the outer upper cylindrical connection portion 72. Further, when employing a pin as the connecting member 77, the pin can be pressed into the outer upper cylindrical connection portion 72. Accordingly, the connecting member 77 serves to retain the connected state between the engagement outer flange portion 74S and the engagement inner flange portion 74U such that they will not be disconnected from each other.

Therefore, the engagement inner flange portion 74U and the engagement outer flange portion 74S are allowed to compose a connector connecting the outer upper cylindrical connection portion 72 and the outer lower cylindrical connection portion 73. Further, a front end surface of the engagement inner flange portion 74U is provided with a slanted guiding section 74T declining from the outside to the inside, whereas a front end surface of the engagement outer flange portion 74S is provided with a slanted guiding section 74T slanting upward from the inside to the outside. These slanted guiding sections 74T, 74T allow the engagement outer flange portion 74S to be smoothly inserted into the engagement inner flange portion 74U.

In the aforementioned mat main body 5, there are bored: a center through hole 81 allowing the half body connecting portion 65 to be inserted therethrough; and outer through holes 82 allowing the outer connecting portions 71 to be inserted therethrough. That is, the connected state of the half body connecting portion 65 is retained inside the center through hole 81, and the connected states of the outer connecting portions 71 are retained inside the outer through holes 82, thus allowing the second fastening member 6 to be fixed to the mat main body 5 with the corresponding mat main body 5 being sandwiched by the upper and lower half bodies 61, 62. Further, as shown in FIG. 3, for example, a plurality of pins 83 are provided on a periphery of a lower surface of the main body 61H of the upper half body 61, the pins 83 being inserted into and engaged with the mat main body 5. Furthermore, as shown in FIG. 2, for example, a plurality of pins 84 are provided on a periphery of an upper surface of the main body 62H of the lower half body 62, the pins 84 also being inserted into and engaged with the mat main body 5. These pins 83, 84 allow the second fastening member 6 to be fixed to the mat main body 5 in a whirl-stop fashion.

Further, there is provided in the upper cylindrical connection portion 63 an insertion receiving section 90 allowing the aforementioned rotating knob 31 to be engaged therewith, the rotating knob 31 serving as the retainer. The insertion receiving section 90 includes: an elongated receiving hole 91 provided in the upper cylindrical connection portion 63 and being smaller than the corresponding upper cylindrical connection portion 63; and an engagement receiving section 92 that is formed into a shape of a partition plate and provided on both sides of the elongated receiving hole 91 in the width direction. Here, the elongated receiving hole 91 is formed so large that it allows the aforementioned operable portion 32 of the rotating knob 31 to be inserted therethrough. Particularly, the center upper surface 25 of the cylindrical portion 24 is to be engageably inserted into the elongated receiving hole 91. With the center upper surface 25 being inserted into the elongated receiving hole 91 in this manner, a lower surface of the engagement receiving section 92 on both sides of the elongated receiving hole 91 in the width direction can now abut against the step level surface 27, thereby allowing the second fastening member 6 to be positioned to the first fastening member 4 and the operable portion 32 in a locked position to be engaged with an upper surface of each engagement receiving section 92.

Next, there are described how the second fastening member 6 is fixed to and unfixed from the first fastening member 4, using the rotating knob 31. In the beginning, as shown in FIG. 4, an unlocked position of the rotating knob 31 refers to a position in which the longitudinal direction of the rotating knob 31 has been adjusted to that of the elongated hole 28, i.e., the center upper surface 25 after rotating the corresponding rotating knob 31. Particularly, the rotating knob 31 is at first rotated to the unlocked position through the operable portion 32 and the raised lever 41, followed by mounting the second fastening member 6 on the first fastening member 4 such that the lever 41 and the operable portion 32 are inserted through the elongated receiving hole 91, thus allowing the center upper surface 25 of the cylindrical portion 24 to be engageably inserted into the elongated receiving hole 91. Next, once the rotating knob 31 has been rotated to the locked position by 90 degrees, the base portion 35 of the rotating knob 31 will be engaged with upper sections of the engagement receiving sections 92 of the second fastening member 6, thus forming a locked state in which the second fastening member 6 is fixed to the first fastening member 4.

Here, as shown in FIG. 13, for example, the linear sections 34B, 34B of the intermediate portion 34 are held by the holding walls 53, 53 in both the locked position and the unlocked position. When rotating the rotating knob 31 under such condition, the rotating knob 31 will actually rotate with the intermediate portion 34 being in contact with the surfaces of the holding walls 53, thereby causing the holding walls 53 to undergo elastic deformation and a rotary torque to be applied to the intermediate portion 34 from the supporting portion 56, thus achieving a favorable click feeling that is available for a long period of time. Further, since the supporting portion 56 is integrally provided on each holding wall 53, the supporting portion 56 allows an operating load of the rotating knob 31 to be increased, and the corresponding operating load can then be set based on the size or the like of the supporting portion 56.

Furthermore, provided on an upper surface of the main body 61H of the upper half body 61, are one or more engagement concave sections 93, 93 serving as engagement sections allowing the lever 41 in the locked position of the rotating knob 31 to be engaged therewith. The engagement concave sections 93 are separately provided on both sides of the second fastening member 6 in the width direction, and are specifically provided on an upper surface 61J of the main body 61H of the upper half body 61, the engagement concave sections 93 being connected to the insertion receiving section 90. Further, the lever 41 is formed so long that it fits within an edge 61F of the main body 61H of the upper half body 61 of the second fastening member 6, when brought down on one of the engagement concave sections 93, 93. In the present embodiment, a front end 41S of the lever 41 brought down is positioned in a location substantially identical to that of the edge 61F, and does not protrude therefrom. Further, each engagement concave section 93 is formed so wide that the lever 41 can fit therein. Particularly, as for the lever 41 that has been brought down, both sides of the lever 41 in the width direction can be engaged with end edges 93F, 93F of the engagement concave section 93, thus preventing the rotating knob 31 from rotating. That is, the rotating knob 31 can be rotated only when the lever 41 is raised, thereby improving a locking reliability regardless of shoe material and shape. Further, as shown in FIG. 2 in which the lever 41 is engaged with the engagement concave section 93, a gap 94 is formed between a lower surface of the front end 41S and the engagement concave section 93, the gap 94 being utilized to raise the lever 41.

That is, the rotating knob 31 is to be rotated to the locked position, followed by bringing down the lever 41 at the corresponding locked position, thereby fixing the mat main body in two steps, thus reliably retaining a fixed state thereof. Further, a strong fixation is possible due to the fact that the lever 41, when brought down, can be received and held by the engagement concave section 93. Furthermore, the lever 41 can fit in the engagement concave section 93, thereby making it possible to restrict the rotation of the rotating knob 31, and evoking no troublesome feeling when fixing the mat main body 5 due to the fact that there are now less protrusions. In fact, the lever 41 can be brought down either forward or backward to enable fixation, thus allowing the second fastening member 6 to be mounted easily. Particularly, a structure allowing the lever 41 to be brought down forward makes operations at the time of mounting/dismounting easier, whereas a structure allowing the lever 41 to be brought down backward makes locations of passengers' feet less influential when fixing the mat main body 5.

Figure 22:
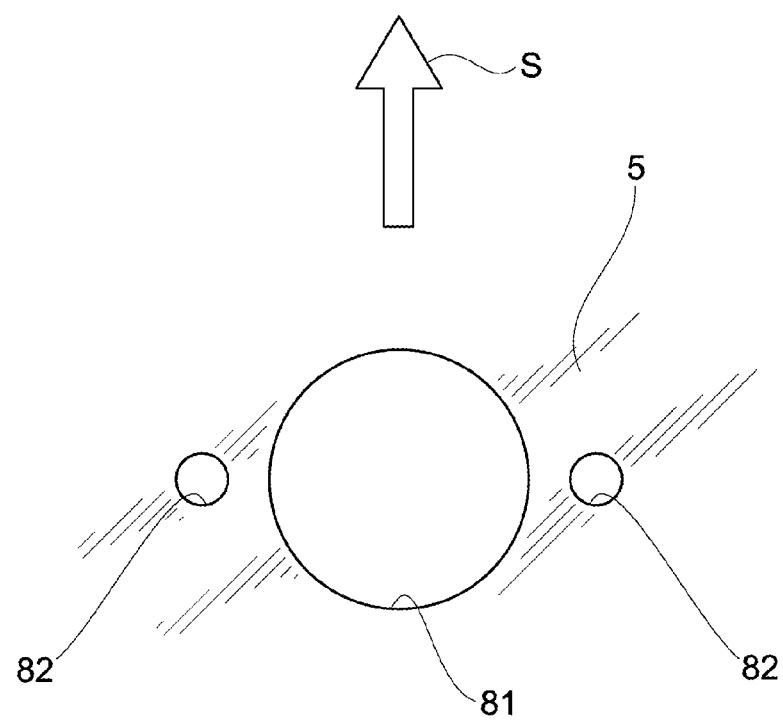
FIG. 22 is a plan view showing a main section of a mat main body of the first embodiment where a center through hole and outer through holes are provided.

The first fastening member 4 and the second fastening member 6 are fixed to the vehicle carpet 3 and the mat main body 5 as follows. That is, as shown in FIG. 1, the mat main body 5 extends rearward from the gas pedal 8 as well as the brake pedal 9. The second fastening member 6 is so fixed to the mat main body 5 that it can be provided on a rear section of the corresponding mat main body 5 and in the vicinity of a rear extended line of the gas pedal 8. Further, as for the fastening device 7 on the right side in FIG. 1, the half body connecting portion 65 and the outer connecting portions 71, 71 are arranged in a direction substantially orthogonal to the rear extended line of the gas pedal 8. This type of arrangement allows the engagement concave sections 93, 93 to be disposed in the front-rear direction substantially parallel to the rear extended line of the gas pedal 8, and the lever 41 to be brought down also in the front-rear direction substantially parallel to an advancement direction S of an advancing vehicle. Further, as shown in FIG. 22, the center through hole 81 and the outer through holes 82, 82 are so formed on the mat main body 5 that they are provided in a direction substantially orthogonal to the advancement direction S. Furthermore, as shown in FIG. 1, the fastening device 7 is also disposed on a rear left side of the mat main body 5.

Accordingly, the outer connecting portions 71 provided beyond the half body connecting portion 65, allow the upper half body 61 and the lower half body 62 to be further strongly held by the mat main body 5. Further, the second fastening member 6 can be provided on the rear section of the mat main body 5 and in the vicinity of the rear extended line of the gas pedal 8, thereby achieving an improved and sufficient holding strength with respect to a load applied toward a front direction of the mat main body 5 by the passenger maneuvering the gas pedal. Furthermore, the half body connecting portion 65 and the outer connecting portions 71 are disposed in a direction orthogonal to the advancement direction S, thereby distributing a load applied to the half body connecting portion 65, thus preventing the half body connecting portion 65 from being disengaged and allowing the same to be further strongly held by the mat main body 5.

According to the present embodiment and as set forth in claim 1, the vehicle floor mat 1 includes: the mat main body 5; and at least one fastening device 7 for fastening the mat main body 5 to the vehicle. The fastening device 7 includes:

the first fastening member 4 fixed to the vehicle; and the second fastening member 6 fixed to the mat main body 5. The first fastening member 4 includes: the rotating knob 31 rotating about a vertical axis; and the lever 41 pivotally provided on the upper section of the rotating knob 31, whereas the second fastening member 6 includes the insertion receiving section 90 allowing the rotating knob 31 to be inserted thereinto. The insertion receiving section 90 further allows the rotating knob 31 inserted thereinto to be engaged therewith as a result of rotating the corresponding rotating knob 31. The lever 41 is then brought down with the rotating knob 31 being engaged with the insertion receiving section 90, thus restricting the rotation of the rotating knob 31. For these reasons, the rotating knob 31 and the lever 41 allow the mat main body 5 to be fixed to the vehicle through a two-step fixation mechanism, thus enabling a strong fixation.

Further, according to the present embodiment and as set forth in claim 2, the second fastening member 6 includes the engagement concave sections 93 serving as engagement sections allowing the lever 41 brought down to be engaged therewith. Therefore, the rotation of the rotating knob 31 can be restricted by bringing down the lever 41 and then allowing the same to be engaged with one of the engagement concave sections 93 of the second fastening member 6.

Furthermore, according to the present embodiment and as set forth in claim 3, the engagement sections are the engagement concave sections 93, and the lever 41, when brought down, is to be engaged with, received and held by one of the engagement concave sections 93 of the second fastening member 6, thereby enabling a strong fixation, restricting the rotation of the rotating knob 31, and allowing the mat main body 5 to be fixed without troublesome feeling due to the fact that there are now less protrusions.

Furthermore, according to the present embodiment and as set forth in claim 4, the lever 41 is formed so long that it fits within the edge 61F of the second fastening member 6, when engaged with one of the engagement concave sections 93. That is, the front end 41S of the lever 41 does not protrude, and is thereby less likely to come into contact with a shoe or the like, thus allowing the mat main body 5 to be fixed without troublesome feeling.

Furthermore, according to the present embodiment and as set forth in claim 5, the lever 41 is brought down substantially along the advancement direction S of the vehicle, thereby enabling fixation regardless of whether the lever 41 is brought down forward or backward, and allowing the second fastening member 6 to be mounted easily. Particularly, the structure allowing the lever 41 to be brought down forward makes operations at the time of mounting/dismounting easier, whereas the structure allowing the lever 41 to be brought down backward makes locations of passengers' feet less influential when fixing the mat main body 5.

Furthermore, according to the present embodiment and as set forth in claim 6, the vehicle floor mat 1 includes: the mat main body 5; and at least one fastening device 7 for fastening the mat main body 5 to the vehicle. Each fastening device 7 includes: the first fastening member 4 fixed to the vehicle; and the second fastening member 6 fixed to the mat main body 5. The first fastening member 4 includes the rotating knob 31 rotating around a vertical axis, whereas the second fastening member 6 includes the insertion receiving section 90 allowing the rotating knob 31 to be inserted thereinto. Particularly, when rotated, the rotating knob 31 thus inserted into the insertion receiving section 90 can then be engaged with the corresponding insertion receiving section 90. Here, the rotating knob 31 includes: the operable portion 32 provided on the upper section thereof; and the connection holding portion 33 that is provided on the lower section thereof and is to be connected to the first fastening member 4. Particularly, the intermediate portion 34 having the noncircular cross-sectional surface, is provided between the operable portion 32 and the connection holding portion 33, the intermediate portion 34 being rotatably and axially supported by the first fastening member 4 and held by the elastic holding walls 53 of the first fastening member 4. Here, since the intermediate portion 34 of the rotating knob 31 is held by the elastic holding walls 53, the rotating knob 31 can be rotated smoothly, thus achieving an improved operational feeling. Further, since the holding walls 53 holding the intermediate portion 34 are formed into the shapes of walls, durabilities of the holding walls 53 can be improved, thus making the operational feeling available for a long period of time. Furthermore, since the intermediate portion 34 is received by wider surfaces of the holding walls 53, an occurrence of looseness can be restricted.

Furthermore, according to the present embodiment and as set forth in claim 7, since the supporting portions 56 are formed behind the holding walls 53 holding the intermediate portion 34 of the rotating knob 31, there can be adjusted a force used to operate the rotating knob 31, thereby improving a degree of freedom of setting the operational feeling.

Effects of the present embodiment are as follows. That is, the lever connecting shaft 37 has the noncircular cross-sectional surface formed into a substantially square shape, and the lever 41 is provided with the lever connecting section 43. Particularly, the lever connecting section 43 is rotatably engaged with the lever connecting shaft 37, thereby allowing the lever 41 to be retained regardless of whether the lever 41 is in a horizontal state (engaged state) in which the lever 41 is engaged with the engagement concave section 93, or a vertical state (non-engaged state) in which the lever 41 is not engaged with the engagement concave section 93. Thus, the lever 41 can be prevented from being inadvertently raised. Further, since there is provided on the rotating knob 31 the lever 41, the rotating knob 31 can be rotated easily when the lever 41 is raised. Meanwhile, the lever 41, when brought down, makes it difficult for the rotating knob 31 to be rotated even when no engagement section is provided.

Other effects of the present embodiment are as follows. That is, the intermediate portion 34 includes: the curved corners 34A formed through chamfering; and the linear sections 34B formed between the adjacent curved corners 34A, 34A. Particularly, since the adjacent linear sections 34B form an angle of 90 degrees therebetween, the rotating knob 31, when rotated by 90 degrees, can be stopped from rotating and fixed between the holding walls 53, 53. In addition, elasticities of the holding walls 53 can be adjusted by changing thicknesses and heights thereof. Here, since the supporting portion 56 is formed in the center of each holding wall 53 in the longitudinal direction, a similar operational feeling can be achieved even when rotating the rotating knob 31 in a different direction. Further, the holding walls 53, 53 allow the connection holding portion 33 of the rotating knob 31 to be connected thereto in a retained manner, the holding walls 53, 53 having curved corners 53W allowing the connection holding portion 33 to be easily inserted therebetween. Furthermore, both sides of each holding wall 53 are connected to the fixing walls 52, 52, thereby achieving a favorable operational feeling even when a load is being applied from the intermediate portion 34. Furthermore, the slit 55 is formed between each holding wall 53 and the lower surface 27K of the step level surface 27 serving as a fixing portion, thereby causing the holding wall 53 to exhibit a favorable elasticity. Furthermore, a left-right width of the inner surface 53N of each holding wall 53 is wider than the distance H of the intermediate portion 34, and a left-right width of a front surface of the supporting portion 56 is narrower than the distance H, thereby making it possible to receive the intermediate portion 34 with a wide area and allowing the supporting portion 56 to undergo elastic deformation under the force applied from the intermediate portion 34, thus achieving a favorable click feeling.

Second Embodiment

Figures 19A, 19B, 19C:
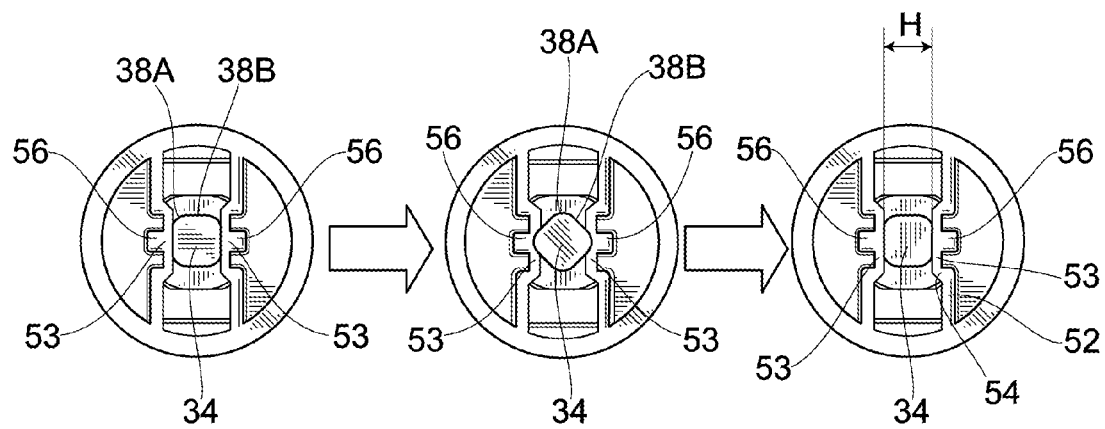
FIG. 19A is a first bottom explanatory view showing how the intermediate portion of the first embodiment is rotated when held by the holding walls.
FIG. 19B is a second bottom explanatory view showing how the intermediate portion of the first embodiment is rotated when held by the holding walls.
FIG. 19C is a third bottom explanatory view showing how the intermediate portion of the first embodiment is rotated when held by the holding walls.
Figure 23:
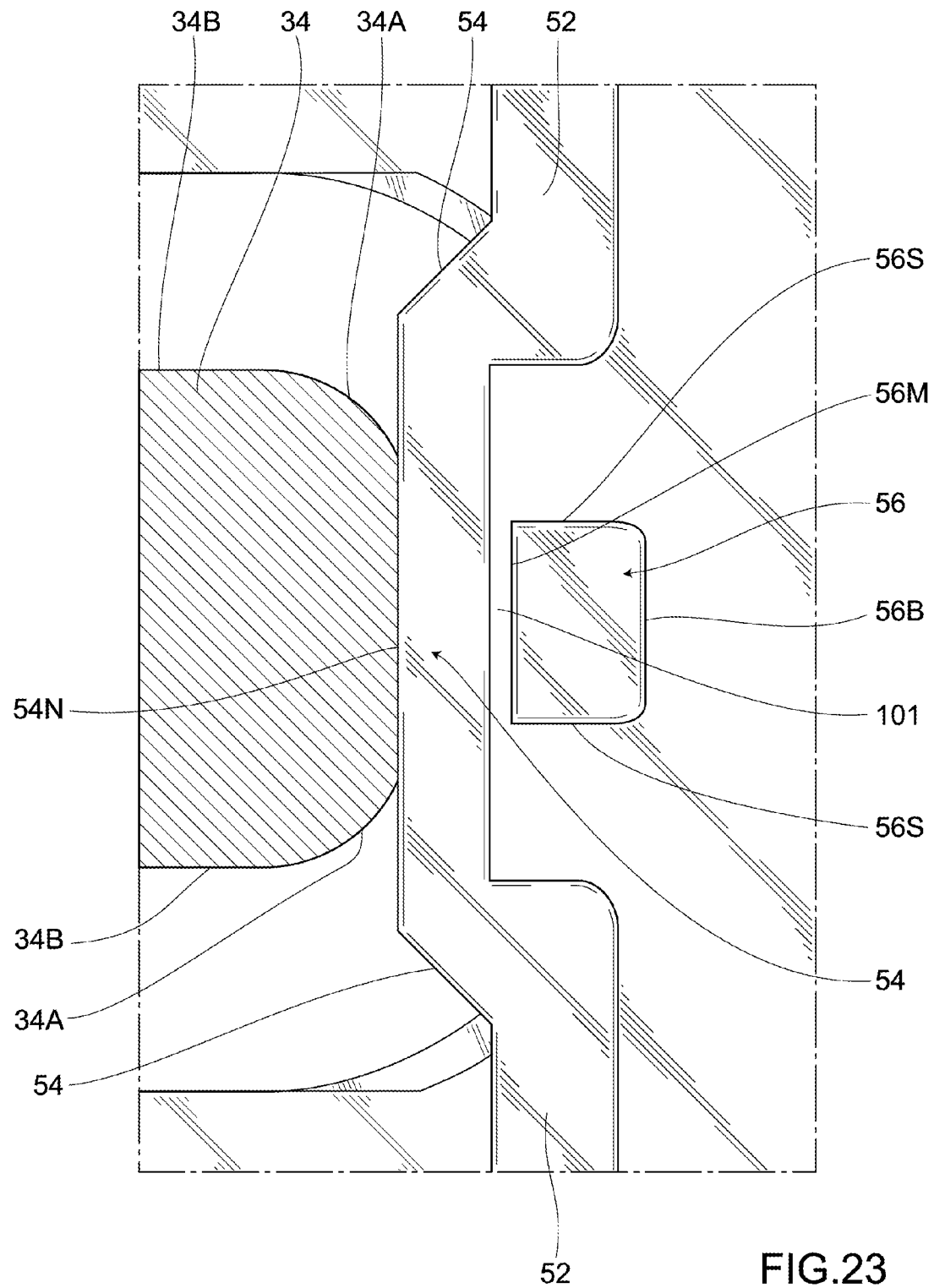
FIG. 23 is an enlarged bottom view showing peripheries of a holding wall and a supporting portion of a second embodiment of the present invention, that is taken along a cross-sectional surface of an intermediate portion.

A second embodiment of the present invention is shown in FIG. 23. Here, elements identical to those in the first embodiment are given identical symbols, and the descriptions thereof are thereby omitted. In the present embodiment, a gap 101 is formed between a back surface of each holding wall 53 and a front surface 56M of each supporting portion 56. The gap 101 is present in both the locked position and the unlocked position, and the holding wall 53 is not connected to any section except the fixing walls 52 on both sides. As shown in FIG. 19B in which the intermediate portion 34 is in the process of being rotated, the back surfaces of the elastically deformed holding walls 53 are caused to press against the front surfaces 56M of the supporting portions 56, thereby causing the gaps 101 to disappear and the supporting portions 56 to undergo elastic deformation under the force applied from the intermediate portion 34. That is, the supporting portions 56 and the holding walls 53 bring about a favorable operational feeling of the intermediate portion 34.

Here, although the back surface of each holding wall 53 and the front surface 56M of each supporting portion 56 are substantially parallel to each other, a slanting tapered arrangement may also be employed from the perspective of performing diecutting at the time of synthetic resin molding.

Accordingly, the present embodiment exhibits functions and effects that are similar to those of the first embodiment.

Further, according to the present embodiment and as set forth in claim 8, the gap 101 is provided between each holding wall 53 holding the intermediate portion 34 of the rotating knob 31 and each supporting portion 56, thereby making it possible to adjust an operational force by, for example, adjusting the gap 101 and widening a range of adjustment of the operational force of the rotating knob 31 accordingly, thus further improving the degree of freedom of setting the operational feeling.

Third Embodiment

A third embodiment of the present invention is shown in FIG. 24 through FIG. 34. Here, elements identical to those in the aforementioned embodiments are given identical symbols, and the descriptions thereof are thereby omitted. In the present embodiment, the concavo-convex portions 29 are formed on the lower surface of the upper base portion 12 in a manner such that the through hole 23 is positioned therebetween.

Figure 25:
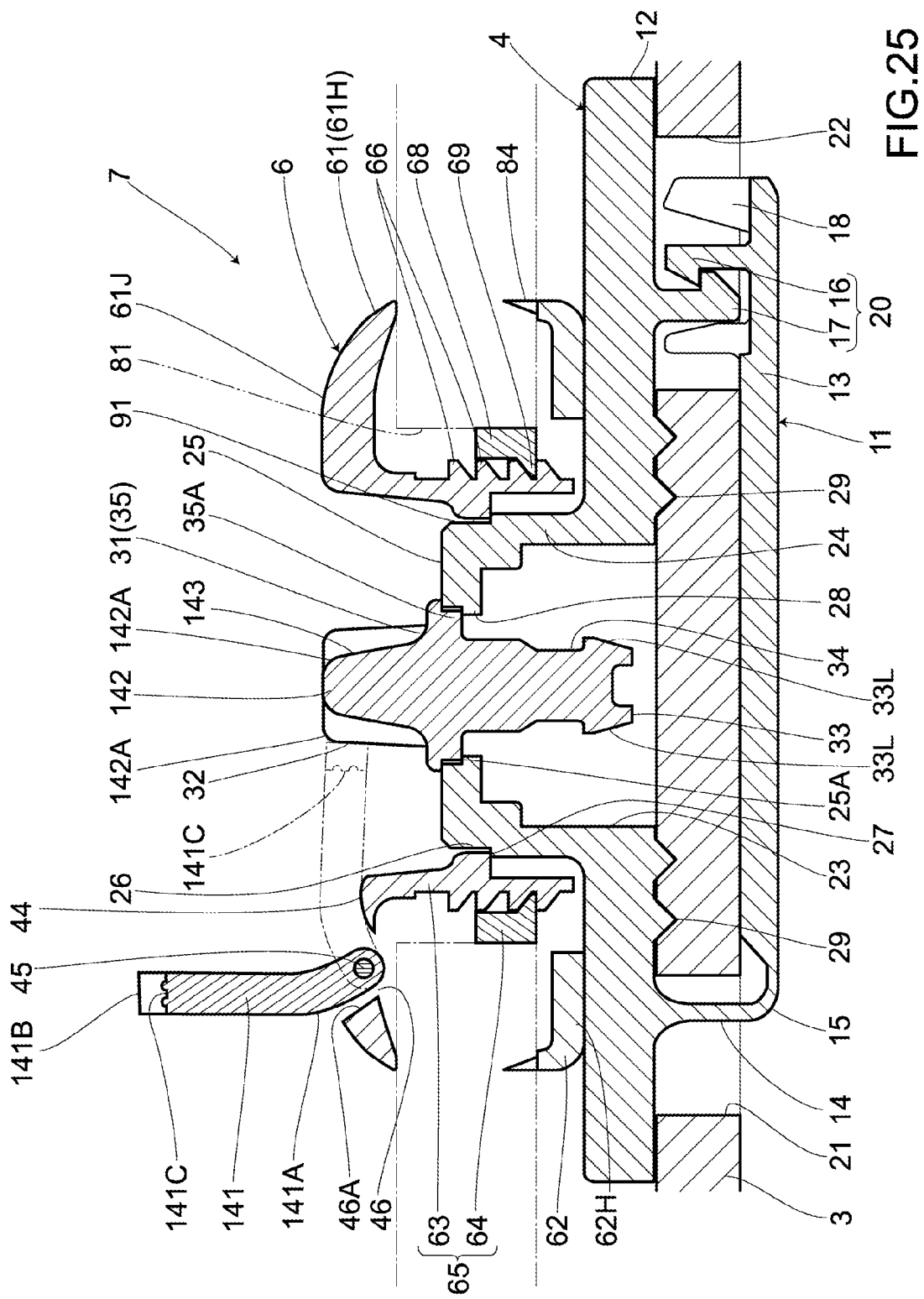
FIG. 25 is a cross-sectional view of the third embodiment, that is taken along a line A-A, i.e, the advancement direction.
Figure 26:
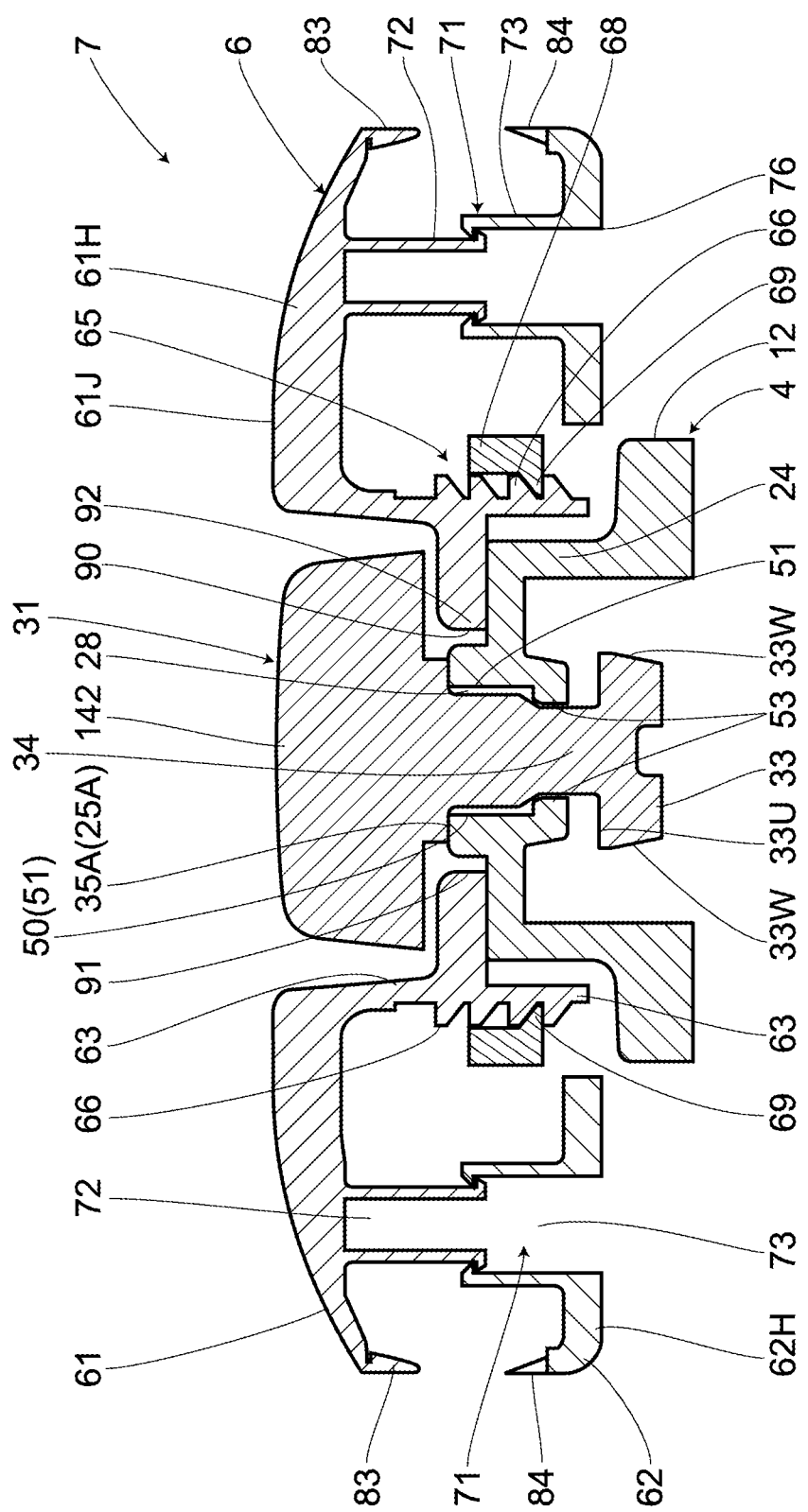
FIG. 26 is a cross-sectional view of the third embodiment, that is taken along a line B-B, i.e., the direction orthogonal to the advancement direction.
Figure 27:
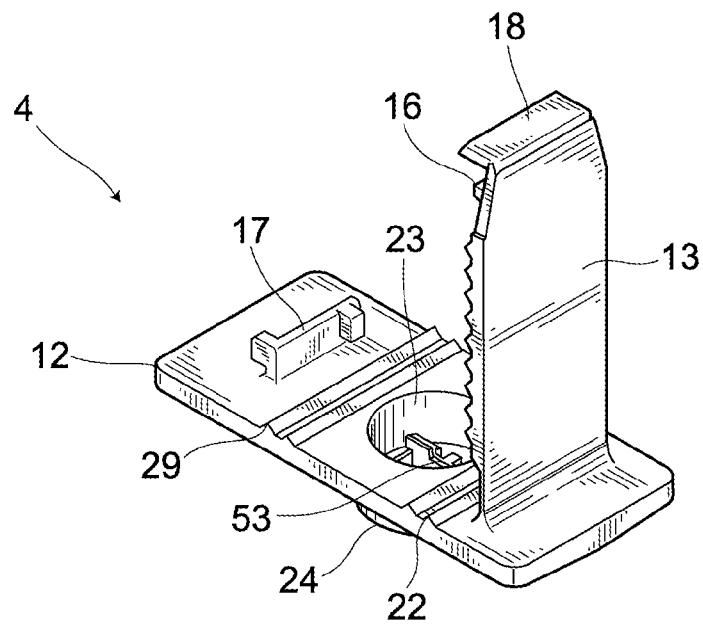
FIG. 27 is a perspective view showing a first fastening member of the third embodiment from a bottom side.

As shown in FIG. 29 through FIG. 32, a lever 141 serving as a rotation inhibiting member is provided on the second fastening member 6, the lever 141 inhibiting the rotation of the rotating knob 31 when engaged therewith. Further, an operable head 142 is provided on the base portion 35 of the operable portion 32. The operable head 142 extends in the longitudinal direction of the base portion 35 when viewed from top, and includes concave curved surfaces 143, 143 that are separately formed on both sides thereof in the width direction. As shown in FIG. 25, for example, the operable head 142 further includes curved corner sections 142A, 142A that are separately formed on both sides of an upper end thereof.

Figure 24:
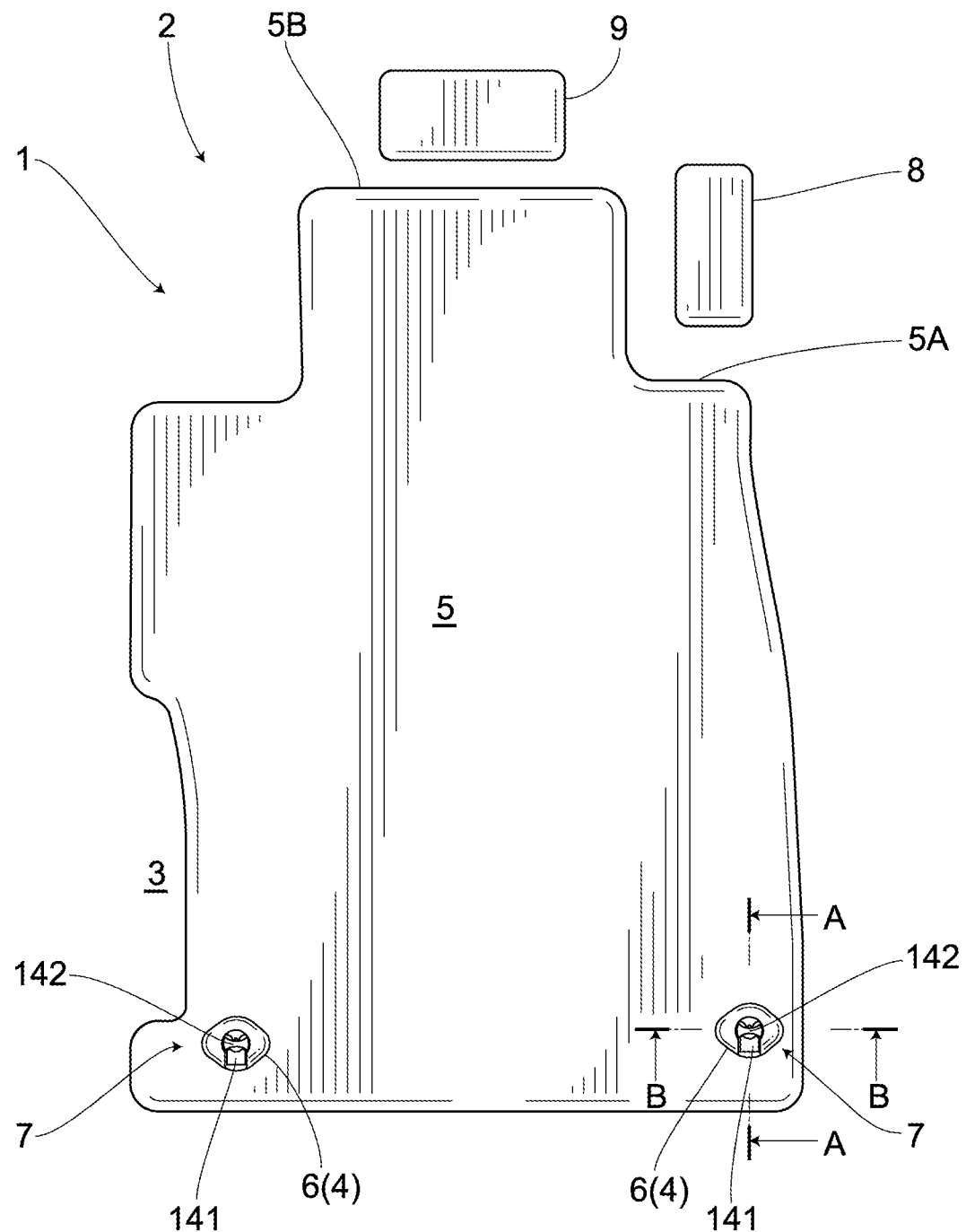
FIG. 24 is an overall plan view showing a third embodiment of the present invention.

The lever 141 has one end thereof rotatably supported by an upper section of the second fastening member 6. Particularly, a concave section 144 is formed on the upper surface of the main body 61H of the upper half body 61. The concave section 144 allows the one end of the lever 141 to be rotatably connected thereto through an outward axis 45, and is provided in one location at an end section of the elongated receiving hole 91 in the longitudinal direction. Step sections 144F, 144F of the concave section 144 are so distant from each other that the lever 141 can be engaged therebetween. As indicated by a dashed-dotted line in FIG. 25, when the lever 141 is engaged with the concave section 144, the lever 141 is either substantially stored in the concave section 144, or allows an upper surface thereof to be substantially located in a same plane as the upper surface of the main body 61H of the upper half body 61. Therefore, the lever 141 has a curved section 141A that is formed on the one end side thereof and conforms to the shape of the upper surface of the main body 61H. Further, a through hole 46 is bored in an outer side of the concave section 144. Here, the one end of the lever 141 partially faces the through hole 46, and an upper surface of the one end of the lever 141 abuts against an outer edge 46A of the through hole 46, thus regulating a rotational position of the lever 141. Particularly, as shown in FIG. 24, the second fastening members 6 are so attached to the mat main body 5 that the concave sections 144 are positioned rearward.

Further, engagement front end edges 141B, 141B are respectively provided on both ends of a front end of the lever 141, the engagement front end edges 141B, 141B engaging with both ends of one of the concave curved surfaces 143. Furthermore, a concave curved edge 141C is formed between the engagement front end edges 141B, 141B. Here, as a result of bringing down the lever 141 and then allowing the same to be engaged with the concave section 144, the engagement front end edges 141B, 141B are respectively caused to engage with both ends of the concave curved surface 143, thereby restricting the rotation of the rotating knob 31.

The lower section of the rotating knob 31 is to be inserted into the cylindrical portion 24 through the elongated hole 28. The first fastening member 4 includes the knob receiving section 50 allowing the rotating knob 31 to be engaged therewith in a retained manner, and rotatably and axially supported thereby. The knob receiving section 50 includes the holding walls 53, 53 allowing the intermediate portion 34 of the rotating knob 31 to be engaged therewith and held therebetween. The holding walls 53, 53 protrude inward and are subjected to the load applied by the intermediate portion 34 as the corresponding intermediate portion 34 rotates.

Here, the connection holding portion 33 of the rotating knob 31 is to be inserted between the holding walls 53, 53 through the elongated hole 28 in the following manner. That is, the connection holding portion 33 is actually pressed into the space between the holding walls 53, 53. Particularly, the holding walls 53, 53, at that time, will be more distant from each other as a result of elastic deformation, thereby allowing the connection holding portion 33 to pass therebetween. Subsequently, the holding walls 53, 53 will be restored in a retained manner, thus also causing the circular bearing surface 35A of the rotating knob 31 to be engaged with the circular concave section 25A formed in the upper section of the elongated hole 28.

Figure 28:
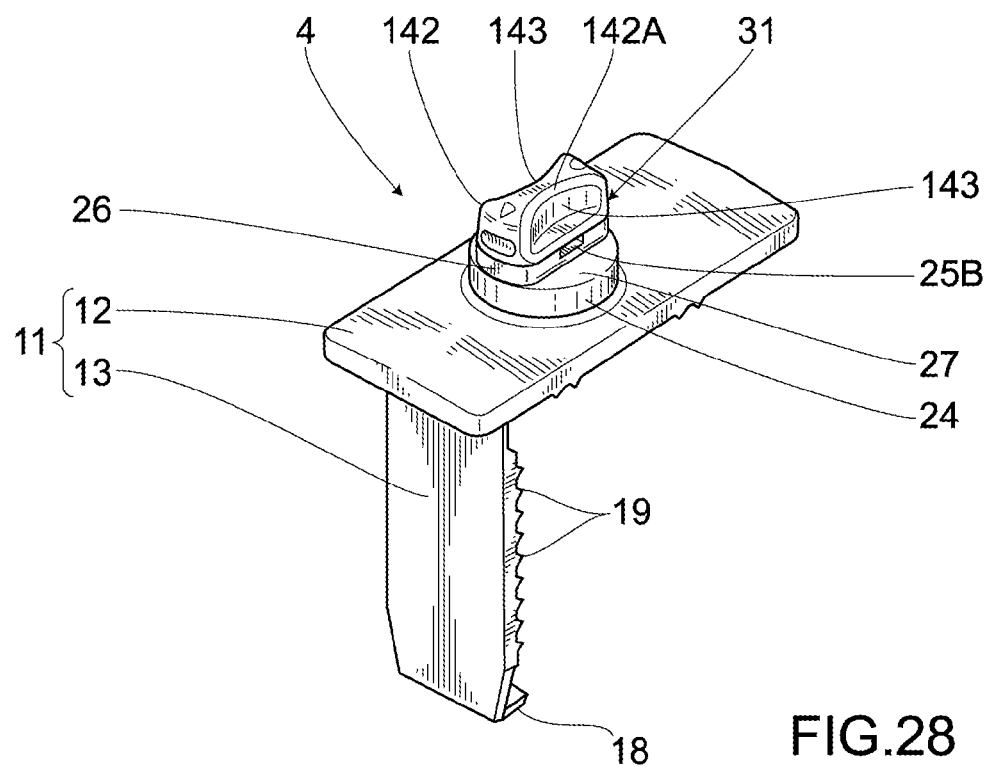
FIG. 28 is a perspective view showing the first fastening member of the third embodiment.
Figure 29:
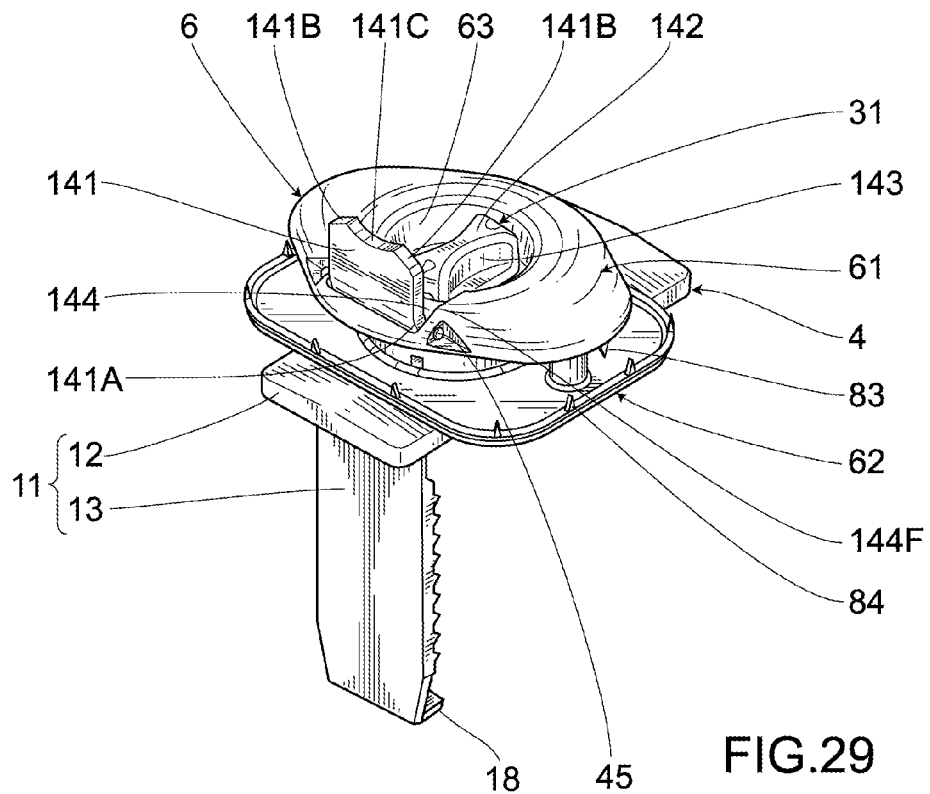
FIG. 29 is a perspective view showing a fastening device of the third embodiment in which a rotating knob has been rotated to an unlocked position.

Next, there are described how the second fastening member 6 is fixed to and unfixed from the first fastening member 4, using the rotating knob 31. In the beginning, as shown in FIG. 28, the unlocked position of the rotating knob 31 refers to the position in which the longitudinal direction of the rotating knob 31 has been adjusted to that of the elongated hole 28, i.e., the center upper surface 25 after rotating the corresponding rotating knob 31. Particularly, the rotating knob 31 is at first rotated to the unlocked position through the operable portion 32, followed by mounting the second fastening member 6 on the first fastening member 4 such that the operable portion 32 is inserted through the elongated receiving hole 91, thus allowing the center upper surface 25 of the cylindrical portion 24 to be engageably inserted into the elongated receiving hole 91. Next, once the rotating knob 31 has been rotated to the locked position by 90 degrees, the base portion 35 of the rotating knob 31 will be engaged with upper sections of the engagement receiving sections 92 of the second fastening member 6, thus forming the locked state in which the second fastening member 6 is fixed to the first fastening member 4.

Here, the intermediate portion 34 is held by the holding walls 53, 53 in both the locked position and the unlocked position. When rotating the rotating knob 31 under such condition, the rotating knob 31 will actually rotate with the intermediate portion 34 being in contact with the surfaces of the holding walls 53, thereby causing the holding walls 53 to undergo elastic deformation and the rotary torque to be applied to the intermediate portion 34 from the supporting portion 56, thus achieving a favorable click feeling that is available for a long period of time.

Figure 30:
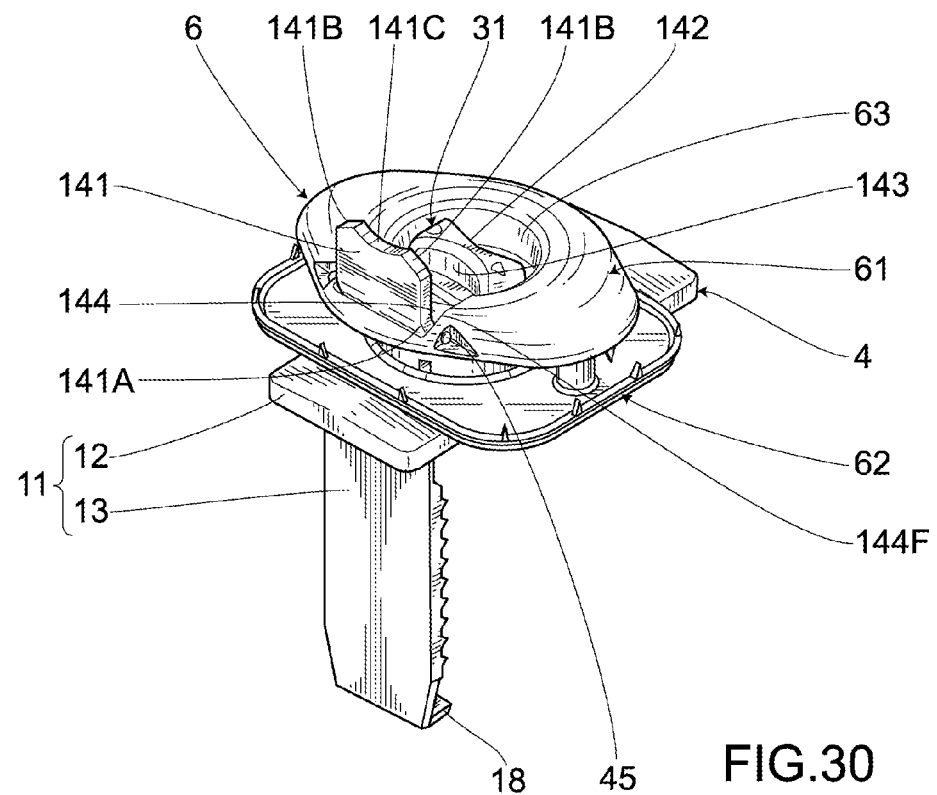
FIG. 30 is a perspective view showing the fastening device of the third embodiment in which the rotating knob has been rotated to a locked position.
Figure 31:
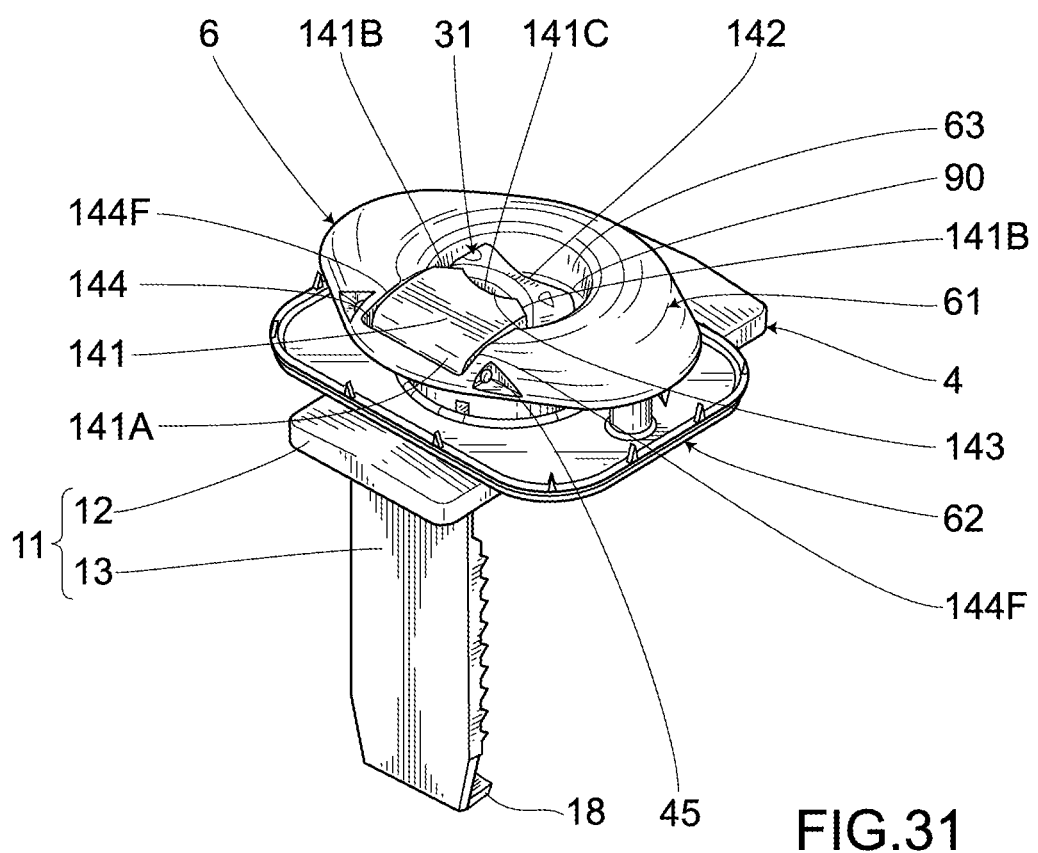
FIG. 31 is a perspective view showing the fastening device of the third embodiment in which a lever of the rotating knob rotated to the locked position is in an engaged state.
Figure 32:
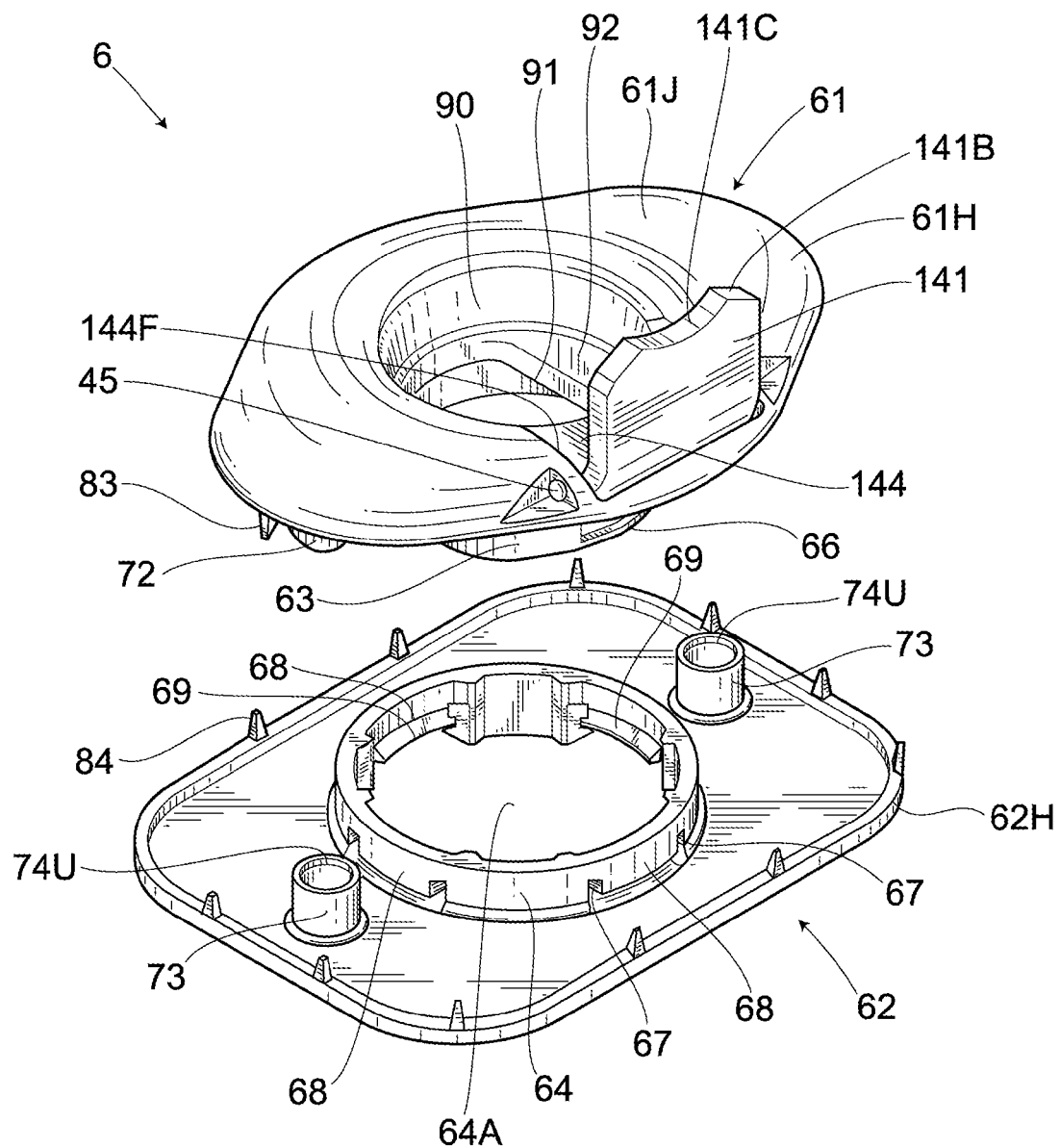
FIG. 32 is an exploded perspective view showing a second fastening member of the third embodiment.
Figure 33:
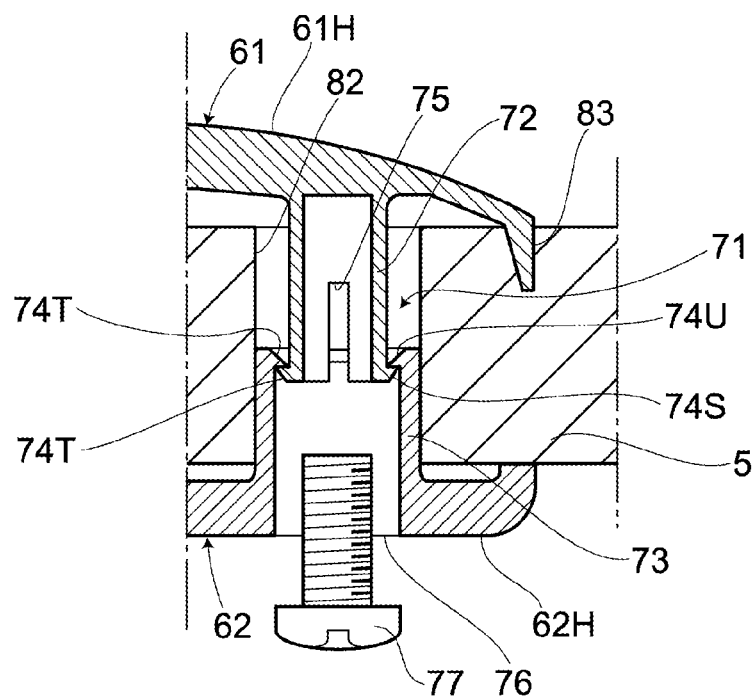
FIG. 33 is an enlarged cross-sectional view showing an outer connecting portion of the second fastening member of the third embodiment.

Further, once the rotating knob 31 has been rotated to the locked position shown in FIG. 30, the lever 141 will be brought down and then engaged with the concave section 144 as shown in FIG. 31. At that time, the engagement front end edges 141B, 141B are respectively caused to engage with both ends of the concave curved surface 143, thereby preventing the rotation of the rotating knob 31. Here, the front end of the lever 141 can be engaged with the operable head 142 only when the rotating knob 31 has been rightly rotated to the locked position. Therefore, bringing down the lever 141 allows there to be confirmed whether or not the rotating knob 31 has been rightly rotated to the locked position. Particularly, if the lever 141 cannot be brought down, the rotating knob 31 may again be rightly rotated to the locked position with the aid of the operable head 142. Further, the lever 141, when brought down and engaged with the concave section 144, does not partially protrude from the second fastening member 6. Particularly, the front end of the lever 141 engaged with the concave section 144, is located below the upper end of the operable head 142, thus avoiding inadvertent contact with the front end of the lever 141. Further, the lever 141, when engaged with the concave section 144, has both sides thereof held between the step sections 144F, 144F, thereby resulting in a reliable fixed state in which the lever 141 does not move even when forcedly rotating the operable portion 32.

Here, a gap is formed between the concave curved surface 143 and the concave curved edge 141C as the rotating knob 31 is fixed and being prevented from rotating by the lever 141, the gap allowing a finger(s) or the like to be inserted thereinto in order to raise the lever 141.

Further, the lever 141 only has to be formed long enough to reach the concave curved surface 143 from the main body 61H. Therefore, the lever 141 is superior in rigidity and durability such that it is less likely to be damaged even when subjected to a force applied in a direction other than the rotating direction.

Furthermore, the locked position also refers to an engaged state in which the first fastening member 4 and the second fastening member 6 are engaged with each other through the rotating knob 31. The rotating knob 31 is at first rotated to such locked position, followed by bringing down the lever 141 under such condition, thereby allowing the mat main body 5 to be fixed in two steps, thus reliably maintaining the fixed state. In addition, the lever 141, when brought down, is to be received and held by the concave section 144, thus enabling a strong fixation, and allowing the mat main body 5 to be fixed without troublesome feeling due to the fact that there are now less protrusions.

The first fastening member 4 and the second fastening member 6 are fixed to the vehicle carpet 3 and the mat main body 5 as follows. That is, as shown in FIG. 24, the mat main body 5 extends rearward from the gas pedal 8 as well as the brake pedal 9. The second fastening member 6 is so fixed to the mat main body 5 that it can be provided on the rear section of the corresponding mat main body 5 and in the vicinity of the rear extended line of the gas pedal 8. Further, as for the fastening device 7 on the right side in FIG. 24, the half body connecting portion 65 and the outer connecting portions 71, 71 are arranged in the direction substantially orthogonal to the rear extended line of the gas pedal 8. This type of arrangement allows the engagement concave sections 93, 93 to be disposed in the front-rear direction substantially parallel to the rear extended line of the gas pedal 8, and the lever 141 to be brought down also in the front-rear direction substantially parallel to the advancement direction of the advancing vehicle. Further, the center through hole 81 and the outer through holes 82, 82 are so formed on the mat main body 5 that they are provided in the direction substantially orthogonal to the advancement direction. Furthermore, as shown in FIG. 24, the fastening device 7 is also disposed on the rear left side of the mat main body 5.

Here, the second fastening member 6 is so attached to the mat main body 5 that the lever 141 can be brought down forward, thereby allowing the lever 141 to hide behind the operable head 142 when fixing the mat main body 5, thus further contributing to malfunction prevention.

However, unlike FIG. 24, operations at the time of mounting/dismounting become easier, if the second fastening member 6 is so attached to the mat main body 5 that the lever 141 can be brought down backward.

According to the present embodiment, the vehicle floor mat includes: the mat main body 5; and at least one fastening device 7 for fastening the mat main body 5 to the vehicle. The fastening device 7 includes: the first fastening member 4 fixed to the vehicle; and the second fastening member 6 fixed to the mat main body 5. The first fastening member 4 includes the rotating knob 31 rotating about a vertical axis, whereas the second fastening member 6 includes the insertion receiving section 90 allowing the rotating knob 31 to be inserted thereinto. The insertion receiving section 90 further allows the rotating knob 31 inserted thereinto to be engaged therewith as a result of rotating the corresponding rotating knob 31. The second fastening member 6 further includes the lever 141 serving as a rotation inhibiting member inhibiting the rotation of the rotating knob 31. For these reasons, the rotating knob 31 and the lever 141 allow the mat main body 5 to be fixed to the vehicle through a two-step fixation mechanism, thus enabling a strong fixation.

Further, according to the present embodiment, the rotation inhibiting member is composed the lever 141 pivotally provided on the upper section of the second fastening member 6. Particularly, the lever 141 has the one end supported by the second fastening member 6, and an other end to be brought down toward the rotating knob 31 and then hold the same. For these reasons, the lever 141, when brought down, holds the rotating knob 31, thus enabling a strong fixation.

Furthermore, according to the present embodiment, the lever 141 can keep holding the rotating knob 31, only when the first fastening member 4 and the second fastening member 6 are engaged with each other through the rotating knob 31, thus reliably maintaining the engaged state.

Furthermore, according to the present embodiment, the other end of the lever 141 is to be engaged with the rotating knob 31 through which the first fastening member 4 and the second fastening member 6 have been engaged with each other. Therefore, the lever 141, when engaged with the rotating knob 31, is allowed to reliably keep holding the corresponding rotating knob 31. Further, since the front end, i.e., the other end of the lever 141 is to be engaged with the rotating knob 31, the front end of the lever 141 does not protrude, and is thereby less likely to come into contact with a shoe or the like, thus allowing the mat main body 5 to be fixed without troublesome feeling.

Furthermore, according to the present embodiment, the second fastening member 6 includes the concave section 144 allowing the lever 141 brought down to be engaged therewith. Therefore, the lever 141, when engaged with the concave section 144, does not partially protrude, thus allowing the mat main body 5 to be fixed without troublesome feeling.

Effects of the present embodiment are as follows. That is, the rotating knob 31 includes the operable head 142 provided on an upper section thereof. Particularly, the operable head 142 extends in the longitudinal direction of the base portion 35, and includes the concave curved surfaces 143, 143 that are separately formed on two wider surfaces of the corresponding operable head 142 in the width direction. Further, the engagement front end edges 141B, 141B are provided on both ends of the front end of the lever 141, the engagement front end edges 141B, 141B engaging with both ends of one of the concave curved surfaces 143. Furthermore, since both ends of the front end of the lever 141 are caused to engage with the operable head 142 at a location distant from a rotation center of the rotating knob 31, there can be achieved a locked state in which the rotating knob 31 is reliably inhibited from rotating in two directions. Here, the gap is formed between the concave curved surface 143 and the concave curved edge 141C as the rotating knob 31 is fixed and being prevented from rotating by the lever 141, the gap allowing a finger(s) or the like to be inserted thereinto in order to raise the lever 141. In addition, the operable head 142 is formed into a shape whose width shrinks upward, and the corner sections 142A, 142A formed on the upper end of the operable head 142 are curved sections, thereby allowing the lever 141 to be brought down smoothly.

Fourth Embodiment

Figure 34:
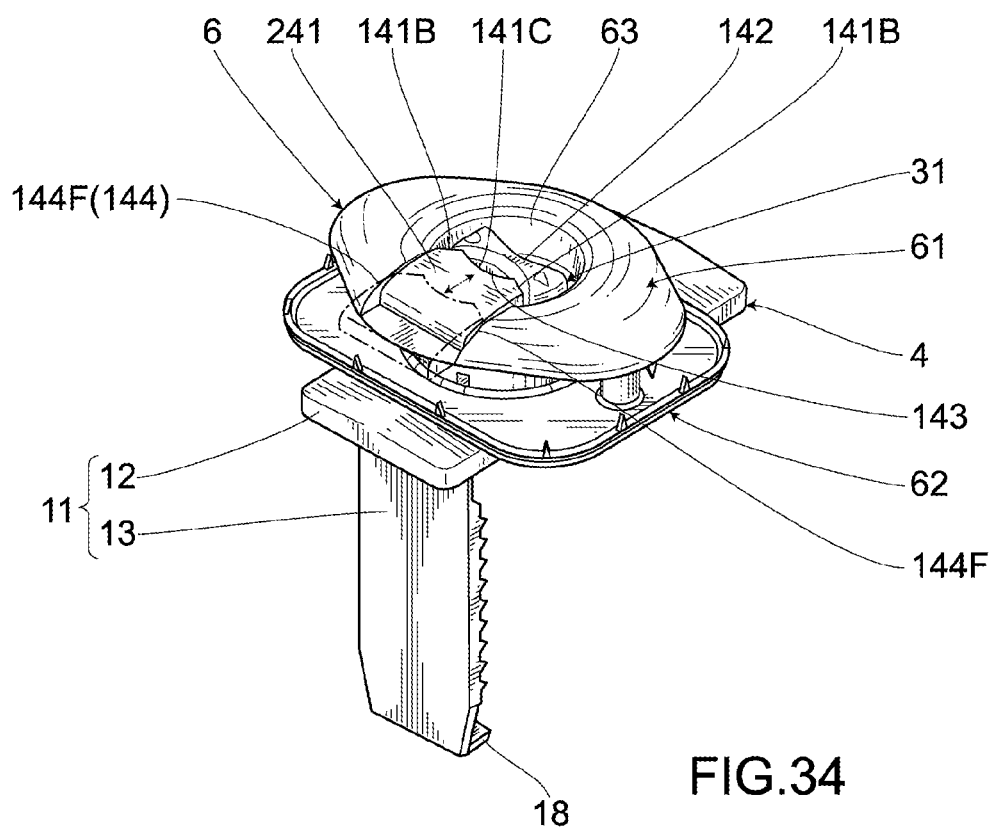
FIG. 34 is a perspective view showing a fastening device of a fourth embodiment of the present invention, in which a lever of a rotating knob rotated to a locked position is in an engaged state.

A fourth embodiment of the present invention is shown in FIG. 34. Here, elements identical to those in the aforementioned embodiments are given identical symbols, and the descriptions thereof are thereby omitted. In the present embodiment, the rotation inhibiting member is a sliding lever 241 formed into a substantial plate shape. Particularly, a guiding section such as a guiding groove or the like (not shown) is provided on each one of the step sections 144F, 144F of the concave section 144, the guiding section allowing a side edge of the lever 241 to be engaged therewith and the lever 241 itself to be slid in the longitudinal direction of the concave section 144. Further, the fourth embodiment includes a position fixing mechanism (not shown) for fixing/unfixing the lever 241 when the engagement front end edges 141B, 141B of the lever 241 are engaged with the concave curved surface 143.

Specifically, the rotating knob 31 is at first rotated to the locked position, followed by sliding the lever 241 toward the rotating knob 31 that has been rotated to the locked position, thereby allowing the engagement front end edges 141B, 141B to engage with the concave curved surface 143. That is, the mat main body 5 is fixed in two steps, thereby reliably maintaining the fixed state.

However, the present invention is not limited to the aforementioned embodiments. In fact, various modified embodiments are possible within the scope of the gist of the present invention. For example, although the aforementioned embodiments employ engagement concave sections serving as engagement sections allowing the lever to be engaged therewith, the lever may also be engaged with a convex section that is one step higher than the upper surface of the upper half body, the convex section serving as an engagement section preventing rotation in such case. Further, although the aforementioned embodiments allow the lever to be brought down both forward and backward, there may be employed a structure allowing the lever raised to be brought down either forward or backward. Furthermore, although the aforementioned embodiments employ the lever of a plate shape, there may also be employed, for example, a lever of a stick shape or a lever having a triangular cross-sectional surface. Furthermore, although the aforementioned embodiments employ curved corners formed by chamfering the corners of the cross-sectional surfaces, chamfering performed in a linear fashion is also acceptable. Furthermore, although the aforementioned embodiments employ the holding walls of uniform thicknesses, there may also be employed a type of holding wall whose thickness differs from part to part, or a type of holding wall whose thickness changes.

Further, there can be used various types of rotation inhibiting members including, for example, a rotation inhibiting member that inhibits the rotation of the rotating knob by allowing a front end thereof to engage with a concave section or through hole provided on the operable portion. Here, as a modified example of using a rotatable lever, there can be provided on an upper section of the operable portion a concave section allowing the front end of the rotation inhibiting member to engage therewith. Further, although the aforementioned embodiment allows the front end of the lever to engage with the two side surfaces of the operable portion in the width direction, the front end of the lever may also engage with the two side surfaces of the operable portion in the longitudinal direction in order to inhibit the rotation of the rotating knob. Furthermore, although the aforementioned embodiment allows the lever to be pivotally connected to the second fastening member through the axis, the lever may also be integrally provided on and supported by the second fastening member through a thin-walled hinge portion allowing the lever to be freely brought up and down.

What is claimed:

1. A vehicle floor mat having: a mat main body; and at least one fastening device for fastening said mat main body to a vehicle, wherein said fastening device comprises:

at least one first fastening member fixed to the vehicle, including a rotating knob rotating about a vertical axis; and at least one second fastening member fixed to said mat main body, including an insertion receiving section for said rotating knob to be inserted thereinto, said rotating knob being engaged with said insertion receiving section by rotating said rotating knob inserted into said insertion receiving section, wherein said first fastening member further comprises a lever pivotally provided on an upper section of said rotating knob, so that said rotating knob, when engaged with said insertion receiving section, is further restricted from rotating by bringing down said lever.

2. The vehicle floor mat according to claim 1, wherein said second fastening member further includes at least one engagement section for said lever to be engaged therewith when brought down.

3. The vehicle floor mat according to claim 2, wherein said engagement section is an engagement concave section for said lever to be engaged therewith when brought down.

4. The vehicle floor mat according to claim 3, wherein said lever is formed to a length allowing said lever to fit within an edge of said second fastening member when said lever is engaged with said engagement concave section.

5. The vehicle floor mat according to claim 3, wherein said lever is brought down substantially along an advancement direction of the vehicle.

6. A vehicle floor mat having: a mat main body; and at least one fastening device for fastening said mat main body to a vehicle,
wherein said fastening device comprises:
at least one first fastening member fixed to the vehicle, including a rotating knob rotating about a vertical axis; and
at least one second fastening member fixed to said mat main body, including an insertion receiving section for said rotating knob to be inserted thereinto, said rotating knob being engaged with said insertion receiving section by rotating said rotating knob inserted into said insertion receiving section,
wherein said rotating knob includes:
an operable portion provided on an upper section thereof;
a connection holding portion provided on a lower section thereof and connected to said first fastening member; and
an intermediate portion that is provided between said operable portion and said connection holding portion and has a noncircular cross-sectional surface, said intermediate portion being rotatably and axially supported by said first fastening member and held by elastic holding walls provided on said first fastening member.

7. The vehicle floor mat according to claim 6, wherein supporting portions are provided rearwardly of said holding walls.

8. The vehicle floor mat according to claim 7, wherein gaps are provided between said holding walls and said supporting portions.

9. A vehicle floor mat having: a mat main body; and at least one fastening device for fastening said mat main body to a vehicle,
wherein said fastening device comprises:
at least one first fastening member fixed to the vehicle, including a rotating knob rotating about a vertical axis; and
at least one second fastening member fixed to said mat main body, including an insertion receiving section for said rotating knob to be inserted thereinto, said rotating knob being engaged with said insertion receiving section by rotating said rotating knob inserted into said insertion receiving section, and
wherein said second fastening member further comprises a rotation inhibiting member inhibiting a rotation of said rotating knob.

10. The vehicle floor mat according to claim 9, wherein said rotation inhibiting member is composed of a lever pivotally provided on an upper section of said second fastening member, said lever allowing one end thereof to be supported by said second fastening member and an other end thereof to be brought down toward said rotating knob to hold said rotating knob.

11. The vehicle floor mat according to claim 10, wherein said lever can keep holding said rotating knob only when said first fastening member and said second fastening member are engaged with each other through said rotating knob.

12. The vehicle floor mat according to claim 11, wherein said lever allows the other end thereof to engage with said rotating knob after said first fastening member and said second fastening member have been engaged with each other through said rotating knob.

13. The vehicle floor mat according to claim 12, wherein said second fastening member further includes a concave section for said lever to engage therewith when brought down.

14. The vehicle floor mat according to claim 4, wherein said lever is brought down substantially along an advancement direction of the vehicle.

* * * * *